United States Patent
Shoda et al.

(10) Patent No.: US 10,156,217 B2
(45) Date of Patent: Dec. 18, 2018

(54) AUTOMATIC STOP/RESTART DEVICE FOR INTERNAL COMBUSTION ENGINE AND AUTOMATIC STOP/RESTART METHOD FOR INTERNAL COMBUSTION ENGINE

(71) Applicants: Tomohisa Shoda, Tokyo (JP); Takeru Okabe, Tokyo (JP); Osamu Ishikawa, Tokyo (JP)

(72) Inventors: Tomohisa Shoda, Tokyo (JP); Takeru Okabe, Tokyo (JP); Osamu Ishikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 274 days.

(21) Appl. No.: 14/423,176

(22) PCT Filed: Oct. 26, 2012

(86) PCT No.: PCT/JP2012/077744
§ 371 (c)(1),
(2) Date: Feb. 23, 2015

(87) PCT Pub. No.: WO2014/064838
PCT Pub. Date: May 1, 2014

(65) Prior Publication Data
US 2015/0252771 A1    Sep. 10, 2015

(51) Int. Cl.
*F02N 11/08*    (2006.01)
*F02D 41/06*    (2006.01)
(Continued)

(52) U.S. Cl.
CPC .......... *F02N 11/0818* (2013.01); *F02D 17/04* (2013.01); *F02D 29/02* (2013.01);
(Continued)

(58) Field of Classification Search
CPC .. F02N 11/0818; F02N 11/0844; F02D 17/04; F02D 29/02; F02D 41/042; F02D 41/065
See application file for complete search history.

(56) References Cited

U.S. PATENT DOCUMENTS

| 6,786,212 B1* | 9/2004 | Choi ....................... F02D 37/02 |
| | | 123/630 |
| 2006/0162701 A1* | 7/2006 | Kassner ................ F02D 41/009 |
| | | 123/479 |

FOREIGN PATENT DOCUMENTS

| CN | 102356225 A | 2/2012 |
| EP | 2 410 158 A1 | 1/2012 |

(Continued)

OTHER PUBLICATIONS

Communication dated Dec. 5, 2016, from the State Intellectual Property Office of the P.R.C. in counterpart Chinese application No. 201280076644.8.

(Continued)

*Primary Examiner* — Kevin A Lathers
(74) *Attorney, Agent, or Firm* — Sughrue Mion, PLLC; Richard C. Turner

(57) ABSTRACT

Provided is a device for performing an automatic stop operation for an internal combustion engine when a predetermined automatic stop requirement is satisfied during an operation of the internal combustion engine and performing a restart operation for the internal combustion engine when a predetermined restart requirement is satisfied during an automatic stop time period of the internal combustion engine. In the device, restart control means (22) executes fuel injection control at the time of start of the restart operation by determining whether or not initial asynchronous injection of a fuel into a cylinder that is in an intake stroke is executable in accordance with an initially detected crank angle after the start of the restart operation and (Continued)

determining a next fuel injection cylinder and a fuel injection timing for the next fuel injection cylinder.

7 Claims, 11 Drawing Sheets

(51) Int. Cl.
*F02D 29/02* (2006.01)
*F02D 41/04* (2006.01)
*F02D 17/04* (2006.01)
*F02D 41/00* (2006.01)

(52) U.S. Cl.
CPC ......... *F02D 41/042* (2013.01); *F02D 41/062* (2013.01); *F02D 41/065* (2013.01); *F02N 11/0844* (2013.01); *F02D 2041/0092* (2013.01); *F02N 2200/021* (2013.01); *F02N 2200/022* (2013.01); *Y02T 10/48* (2013.01)

(56) References Cited

FOREIGN PATENT DOCUMENTS

| | | | |
|---|---|---|---|
| JP | 3477754 | B2 | 12/2003 |
| JP | 2010-223006 | A | 10/2010 |
| JP | 2010223006 | A * | 10/2010 ............. F02D 29/02 |
| JP | 2012-077646 | A | 4/2012 |
| WO | 2010/107094 | A1 | 9/2010 |

OTHER PUBLICATIONS

International Search report for PCT/JP2012/077744 dated Nov. 27, 2012 English Translation.

\* cited by examiner

FIG. 6

| COOLING TEMPERATURE [°C] | BASIC SUPPLY FUEL AMOUNT [mm³] |
|---|---|
| -50 | 400 |
| -25 | 200 |
| 0 | 50 |
| 25 | 25 |
| 50 | 13 |
| 100 | 13 |
| 120 | 13 |

FIG. 7

| INTAKE-PIPE PRESSURE [mmHg] | CORRECTION COEFFICIENT [—] |
|---|---|
| 100 | 0.75 |
| 200 | 0.80 |
| 300 | 0.83 |
| 400 | 0.85 |
| 500 | 0.90 |
| 600 | 0.95 |
| 700 | 0.97 |
| 760 | 1.00 |
| 800 | 1.00 |

FIG. 10

| n | FUEL SUPPLY RANGE | | INTAKE STROKE FINAL VALUE |
|---|---|---|---|
| | LOWER LIMIT VALUE crk_L(n) | UPPER LIMIT VALUE crk_H(n) | crk_E(n) |
| 1 | 0 | 14 | 19 |
| 2 | 19 | 32 | 37 |
| 3 | 37 | 50 | 55 |
| 4 | 55 | 68 | 71 |

FIG. 11

| crk_Ct | |
|---|---|
| CRANK COUNTER CRK | INJECTION CYLINDER |
| 11 | THIRD CYLINDER |
| 29 | FOURTH CYLINDER |
| 47 | SECOND CYLINDER |
| 65 | FIRST CYLINDER |

AUTOMATIC STOP/RESTART DEVICE FOR INTERNAL COMBUSTION ENGINE AND AUTOMATIC STOP/RESTART METHOD FOR INTERNAL COMBUSTION ENGINE

CROSS REFERENCE TO RELATED APPLICATIONS

This application is a National Stage of International Application No. PCT/JP2012/077744 filed Oct. 26, 2012, the contents of all of which are incorporated herein by reference in their entirety.

TECHNICAL FIELD

The present invention relates to an automatic stop/restart device for an internal combustion engine and an automatic stop/restart method for an internal combustion engine, each of which automatically stops the internal combustion engine when a predetermined automatic stop requirement is satisfied while the internal combustion engine is in operation and restarts the internal combustion engine when a predetermined restart requirement is satisfied while the internal combustion engine is in an automatically stopped state.

BACKGROUND ART

In recent years, some internal combustion engines to be mounted in a vehicle use an automatic stop/restart device (so-called idling-stop device) for the internal combustion engine mainly for the purpose of reduction in fuel consumption. The automatic stop/restart device for the internal combustion engine automatically stops the internal combustion engine when a predetermined automatic stop requirement is satisfied in accordance with a deceleration operation and a vehicle stop operation, which are performed by a driver who is driving the internal combustion engine. The automatic stop/restart device for the internal combustion engine automatically restarts the internal combustion engine when a predetermined restart requirement is satisfied in accordance with an acceleration operation and a vehicle start operation, which are performed by the driver.

The above-mentioned related-art automatic stop/restart device for an internal combustion engine has the following problem. For example, for the restart, when the driver performs an operation of starting the vehicle (restart request operation) while the internal combustion engine is rotating by inertia after being automatically stopped, there is a difference between a rotation speed of the internal combustion engine and a rotation speed of a starting device (for example, a starter). Therefore, the starting device cannot be driven until the internal combustion engine stops, which makes time to completion of the restart longer.

Further, the above-mentioned related-art automatic stop/restart device for an internal combustion engine cannot perform fuel supply or an ignition operation before the identification of cylinders of the internal combustion engine is completed in the restart operation after the internal combustion engine is stopped. Therefore, it takes long time to complete the restart. Thus, there is another problem in that the restart request operation by the driver cannot be dealt with.

In order to solve the problems described above, there is disclosed a technology of storing a crank angle at the time when the rotation of the internal combustion engine stops and injecting a fuel into a cylinder in accordance with the stored crank angle at the time of next start so as to start the internal combustion engine at early time (for example, see Patent Literature 1).

CITATION LIST

Patent Literature

[PTL 1] JP 3477754 B2

SUMMARY OF INVENTION

Technical Problem

However, the related art has the following problem.

The rotation speed of the internal combustion engine after the automatic stop or after key off lowers during the rotation by inertia. The internal combustion engine sometimes rotates backward immediately before stopping rotating. According to the related art such as Patent Literature 1, even when the internal combustion engine stops after rotating backward, the crank angle at the time of stop of the rotation of the internal combustion engine is stored without determining the occurrence of the backward rotation.

Accordingly, a deviation is generated between an actual crank angle and the crank angle stored at the time of stop of the rotation. As a result, there is a fear in that an initially injected fuel cannot be supplied to a proper cylinder. Thus, there is a possibility that the initially injected fuel is exhausted as an uncombusted gas or combustion cannot be achieved by initial ignition.

The present invention has been made to solve the problem described above, and therefore has an object to provide an automatic stop/restart device for an internal combustion engine and an automatic stop/restart method for an internal combustion engine, which are capable of supplying a fuel to a proper cylinder of an internal combustion engine at the time of restart to cause a combustion by initial ignition to enable quick restart regardless of a rotation state of the internal combustion engine such as a case where the internal combustion engine is rotating by inertia after being automatically stopped or the internal combustion engine stops after rotating backward.

Solution to Problem

According to one embodiment of the present invention, there is provided an automatic stop/restart device for an internal combustion engine, for performing an automatic stop operation for the internal combustion engine when a predetermined automatic stop requirement is satisfied during an operation of the internal combustion engine and for performing a restart operation for the internal combustion engine when a predetermined restart requirement is satisfied during an automatic stop time period of the internal combustion engine, the automatic stop/restart device including: crank-angle detection means for detecting a crank angle of the internal combustion engine; rotation-speed computation means for computing a rotation speed of the internal combustion engine in accordance with the crank-angle detection means; synchronous fuel injection means for injecting a fuel in synchronization with a predetermined crank angle during the operation of the internal combustion engine; a starting device for cranking the internal combustion engine at time of start and restart of the internal combustion engine; and restart control means for performing a restart operation for the internal combustion engine by controlling the starting device while the rotation speed during the automatic stop time period of the internal combustion engine is decreasing by inertia or after stop. In the automatic stop/restart device, the restart control means includes: an initial asynchronous injection processing section for determining whether or not initial asynchronous injection of the fuel into a cylinder that is in an intake stroke is executable in accordance with an initially detected crank angle after start of the restart operation; and a next injection determination processing section for determining a cylinder that is in a transition from an exhaust stroke to the intake stroke after the initially detected crank angle as a next injection cylinder and determining an injection timing for the next injection cylinder. In the automatic stop/restart device, the restart control means executes fuel injection control at the time of start of the restart operation in accordance with a result of determination by the initial asynchronous injection processing section and a result of determination by the next injection determination processing section.

Further, according to one embodiment of the present invention, there is provided an automatic stop/restart method for an internal combustion engine, for performing an automatic stop operation for the internal combustion engine when a predetermined automatic stop requirement is satisfied during an operation of the internal combustion engine and for performing a restart operation for the internal combustion engine when a predetermined restart requirement is satisfied during an automatic stop time period of the internal combustion engine, the automatic stop/restart method including: a crank-angle detection step of detecting a crank angle of the internal combustion engine; a rotation-speed computation step of computing a rotation speed of the internal combustion engine in accordance with the crank-angle detection step; a synchronous fuel injection step of injecting a fuel in synchronization with a predetermined crank angle during the operation of the internal combustion engine; a starting step of cranking the internal combustion engine at time of start and restart of the internal combustion engine; and a restart control step of performing a restart operation for the internal combustion engine by controlling the starting step while the rotation speed during the automatic stop time period of the internal combustion engine is decreasing by inertia or after stop. In the automatic stop/restart method, the restart control step includes: an initial asynchronous injection processing step of determining whether or not initial asynchronous injection of the fuel into a cylinder that is in an intake stroke is executable in accordance with an initially detected crank angle after start of the restart operation; and a next injection determination processing step of determining a cylinder that is in a transition from an exhaust stroke to the intake stroke after the initially detected crank angle as a next injection cylinder and determining an injection timing for the next injection cylinder. In the automatic stop/restart method, the restart control step includes executing fuel injection control at the time of start of the restart operation in accordance with a result of determination in the initial asynchronous injection processing step and a result of determination in the next injection determination processing step.

Advantageous Effects of Invention

According to one embodiment of the present invention, the fuel is injected into the cylinder that is in the intake stroke in accordance with the initially detected crank angle after the start of the restart operation, and the next fuel injection timing is determined. As a result, the automatic stop/restart device for an internal combustion engine and the automatic stop/restart method for an internal combustion engine can be provided, which are capable of supplying the fuel into the proper cylinder of the internal combustion engine at the time of restart to cause the combustion even by the initial ignition, to thereby enable the quick restart, regardless of the rotation state of the internal combustion engine such as the case where the internal combustion engine is rotating by inertia after being automatically stopped or the internal combustion engine stops after rotating backward.

BRIEF DESCRIPTION OF DRAWINGS

FIG. 6 shows a basic supply fuel amount map based on a cooling temperature at the time of restart of the internal combustion engine according to the first embodiment of the present invention.

FIG. 7 shows a correction coefficient map based on an intake-pipe pressure at the time of restart of the internal combustion engine according to the first embodiment of the present invention.

FIG. 10 shows a fuel supply range map for the internal combustion engine according to the first embodiment of the present invention.

FIG. 11 shows a predetermined crank counter map for the internal combustion engine according to the first embodiment of the present invention.

DESCRIPTION OF EMBODIMENT

Figure 1:
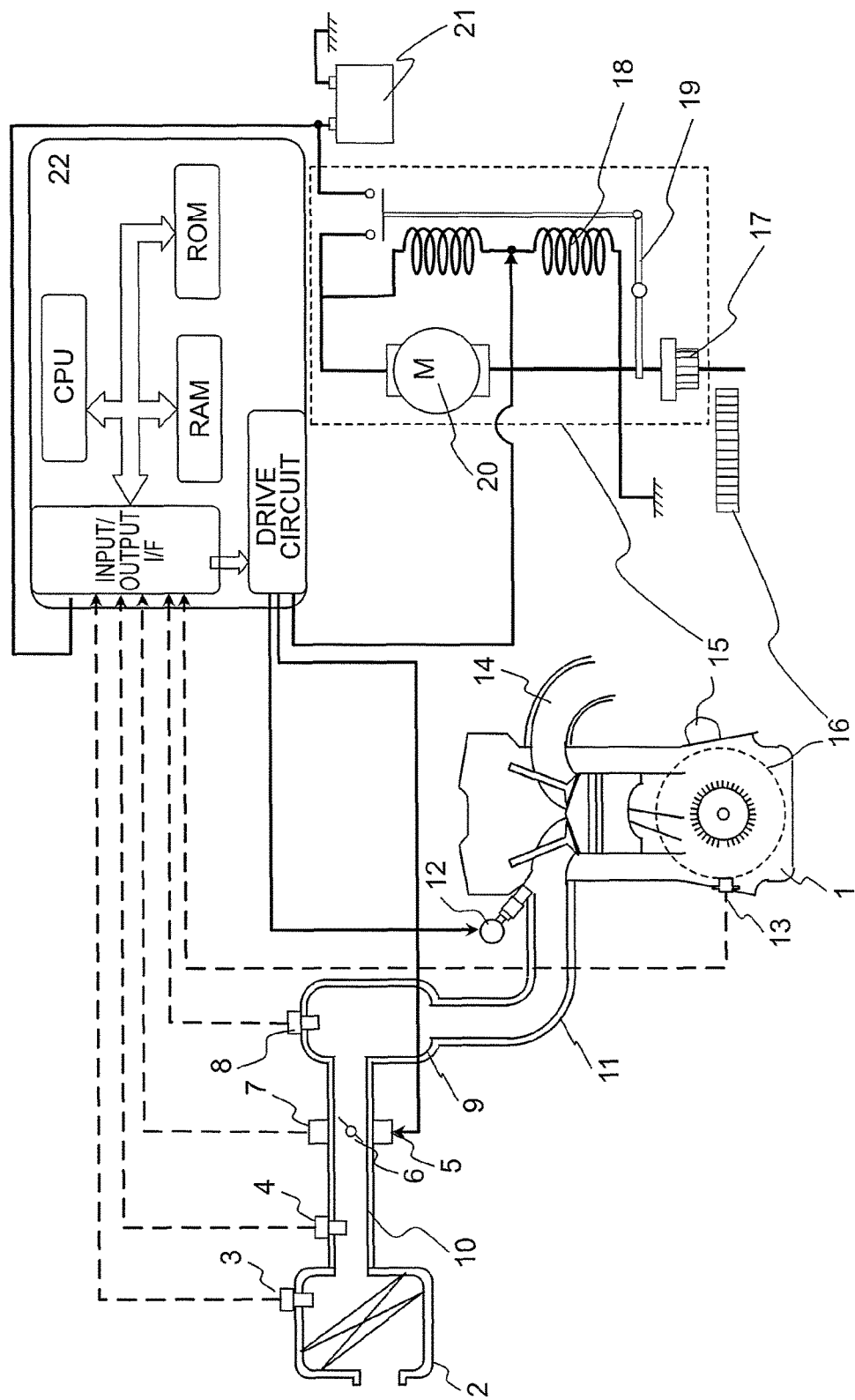
FIG. 1 is a configuration diagram of an automatic stop/restart device for an internal combustion engine according to a first embodiment of the present invention.

Now, an automatic stop/restart device for an internal combustion engine and an automatic stop/restart method for an internal combustion engine according to an exemplary embodiment of the present invention are described referring to the drawings.

First Embodiment

FIG. 1 is a configuration diagram of an automatic stop/restart device for an internal combustion engine according to a first embodiment of the present invention. In FIG. 1, an air filter 2, an intake-air temperature sensor 3 for detecting a temperature of intake air, and an airflow sensor 4 for detecting a flow rate of the intake air are provided upstream of an intake pipe 10 for supplying air into an internal combustion engine 1 (hereinafter referred to simply as "engine 1").

Downstream of the airflow sensor 4, a throttle valve 6 and a throttle-valve opening-degree sensor 7 are provided. The throttle valve 6 operates by a motor 5 to adjust the flow rate of the intake air. The throttle-valve opening-degree sensor 7 detects an opening degree of the throttle valve 6. Further, a surge tank 9 is provided downstream of the throttle valve 6. An intake-pipe pressure sensor 8 for detecting a pressure in the surge tank 9 is provided to the surge tank 9. Air in the surge tank 9 is supplied to each of cylinders of the engine 1 through an intake manifold 11.

A fuel to be supplied to the engine 1 is supplied by a fuel injection valve 12 provided in the vicinity of an intake port of each of the cylinders of the engine 1 and forms an air/fuel mixture with air in the intake manifold 11. Then, the thus formed air/fuel mixture is sent to a combustion chamber of each of the cylinders and is ignited by a spark plug (not shown), thereby causing a combustion. After passing through an exhaust pipe 14 and then a catalytic device (not shown) where a toxic gas is purified, a combustion gas generated by the combustion is exhausted into the atmosphere.

Further, the engine 1 includes a starter 15 and a ring gear 16 coupled to a crankshaft of the engine 1. At the time of start and restart of the engine 1, cranking is performed by the starter 15 and the ring gear 16.

In this case, the starter 15 includes a pinion gear 17, a solenoid 18, a plunger 19, and a starter motor 20. The starter motor 20 is connected to a battery 21 via wiring whose contact point is turned ON by an operation of the plunger 19.

At the time of start and restart of the engine 1, energization of the solenoid 18 is started by a drive signal from an engine control unit (hereinafter referred to as "ECU 22") to be described later. When the energization of the solenoid 18 is started, the plunger 19 is operated to start pushing out the pinion gear 17. Then, when the pinion gear 17 comes into contact with the ring gear 16 to achieve meshing engagement therewith, the contact point coupled to the plunger 19 is turned ON to start rotational driving of the starter motor 20. Then, the cranking of the engine 1 is initiated.

Further, the engine 1 is provided with a water-temperature sensor (not shown) for detecting a cooling water temperature for the engine 1 or a crank-angle sensor 13 for detecting a crank angle of the engine 1. The ECU 22 computes the crank angle, a crank counter CRK, and a rotation speed Ne of the engine 1 based on a detection signal of the crank-angle sensor 13.

In this case, the ECU 22 includes an input/output interface, a microprocessor (CPU), a read-only memory (ROM), a random access memory (RAM), and a drive circuit.

Output signals from the various sensors described above and a detection signal such as the amount of depression of an accelerator pedal (not shown) or the amount of depression of a brake pedal (not shown) are input to the CPU included in the ECU 22 through the input/output interface. Further, the CPU computes whether or not control for automatic stop/restart of the engine 1 can be executed based on the input various signals.

Further, the ROM is a memory for storing a control program and various constants to be used in various computations executed by the CPU. The RAM is a memory for temporarily storing the results of computations in the CPU. The CPU transmits drive signals to the fuel injection valve 12, the starter 15, and the like through the drive circuit in accordance with the results of computations, thereby executing automatic stop/restart control for the engine 1.

The ECU 22 according to the first embodiment of the present invention has the following functions:

(1) function of determining whether or not automatic stop requirements and restart requirements are satisfied;

(2) function of determining whether the engine 1 is rotating forward or backward based on the input signal from the crank-angle sensor 13;

(3) function of executing various control computations such as a computation of the rotation speed Ne of the engine 1; and (4) function of storing setting data to be used for the restart control and the like in the ROM.

Next, a specific method of computing the crank angle, the crank counter CRK, and the rotation speed Ne of the engine 1 by the ECU 22 by using the output signal from the crank-angle sensor 13 is described. In this case, it is supposed that the output signal from the crank-angle sensor 13 used in the first embodiment of the present invention changes in accordance with whether the engine 1 is in the forward rotation state or in the backward rotation state.

Figure 2:
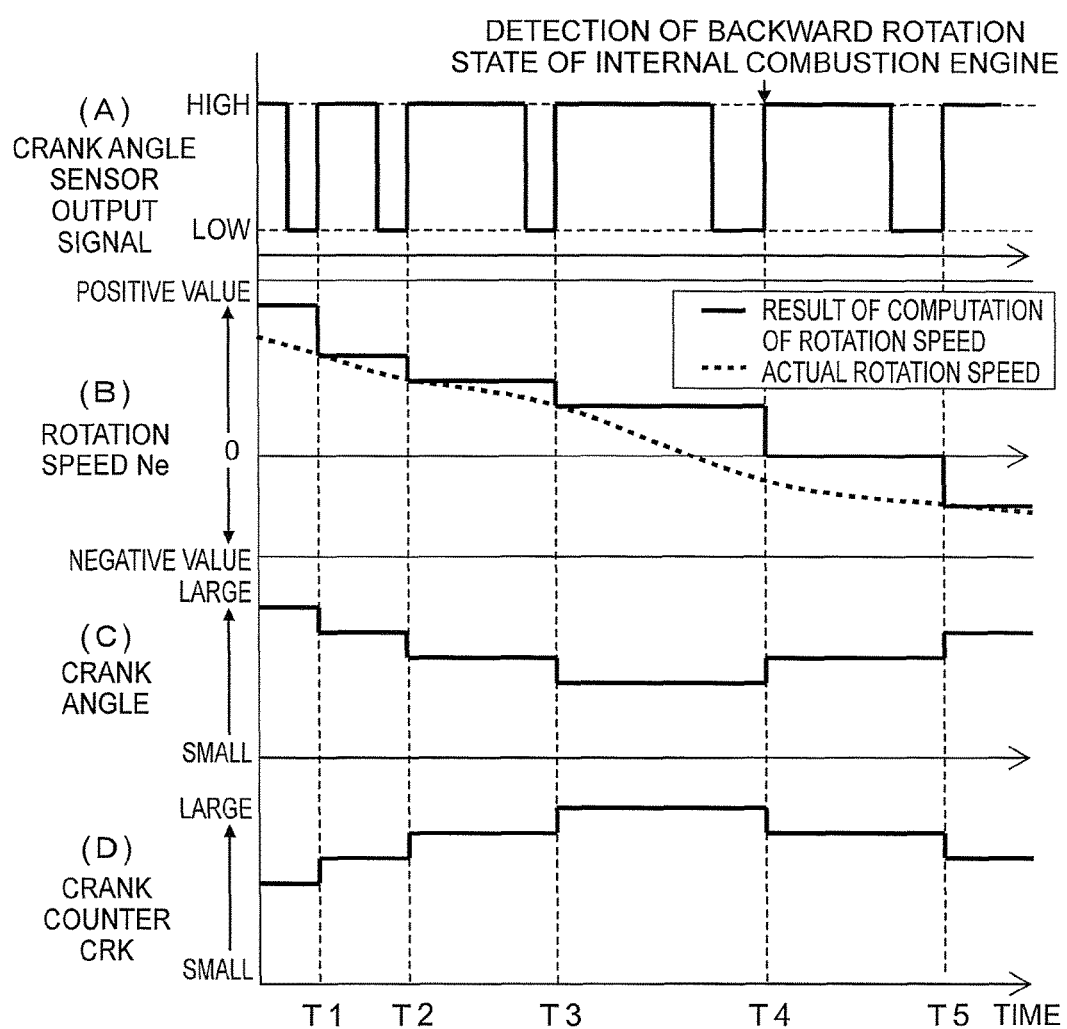
FIG. 2 is an operation explanatory diagram relating to various computations executed by an ECU based on an output signal from a crank-angle sensor during an engine stop process according to the first embodiment of the present invention.

FIG. 2 is an operation explanatory diagram relating to various computations executed by the ECU 22 based on the output signal from the crank-angle sensor 13 during a process of stop of the engine 1 in the first embodiment of the present invention. More specifically, parts (A) to (D) in FIG. 2 show the following contents:

(A): the output signal from the crank-angle sensor 13 in the process of stop of the engine 1;

(B): a computation value of the rotation speed Ne computed in the ECU 22 (a computation value in the forward rotation state is denoted as a positive value and a computation value in the backward rotation state is denoted as a negative value for convenience);

(C): a computation value of the crank angle computed in the ECU 22; and (D): a computation value of the crank counter CRK computed in the ECU 22.

In FIG. 2, a short LOW output time period of the output signal from the crank-angle sensor 13 shown in part (A) means the forward rotation state, whereas a long LOW output time period means the backward rotation state. Each of the crank angle, the crank counter, and the rotation speed Ne of the engine 1 is computed in accordance with timing of the HIGH output signal from the crank-angle sensor 13.

The crank angle is computed so as to become a maximum value with an initially output signal from the crank-angle sensor 13 after compression TDC, using compression TDC of each of the cylinders of the engine 1 as a reference (=0 (zero) degree), and a predetermined value is subtracted therefrom (or is added thereto) before next compression TDC. Further, the crank counter CRK is computed so as to become an initial value (=0 (zero)) after one stroke (intake, compression, combustion, or exhaust) of a first cylinder, that is, two revolutions of the crankshaft, for example, using compression TDC of the first cylinder of the engine 1 as a reference (=0 (zero)), and a predetermined value is added thereto (or is subtracted therefrom) for each output signal from the crank-angle sensor 13. Specifically, for example, in a case where the engine 1 has three cylinders and the crank-angle sensor 13 is output every 10 degrees, the crank angle is computed to be zero degree at the compression TDC of the first cylinder. The output signal from the crank-angle sensor 13 after the compression TDC is 230 degrees. The output signal from the crank-angle sensor 13 before the compression TDC of a second cylinder is 10 degrees and becomes zero at the compression TDC. The crank counter CRK is zero at the compression TDC of the first cylinder, and the predetermined value (for example, 1) is added thereto (or subtracted therefrom) for each output signal from the crank-angle sensor 13. The crank counter CRK becomes, for example, 71 before the compression TDC of the first cylinder and becomes zero at the compression TDC.

In FIG. 2, from a time T1 to a time T3 during which the engine 1 is in the forward rotation state, intervals of the output signals from the crank-angle sensor 13 become longer. Therefore, the computation value of the rotation speed Ne (part (B) of FIG. 2) becomes lower. At this time, the predetermined value is subtracted from the crank angle for each time, whereas the predetermined value is added to the crank counter CRK for each time (parts (C) and (D) of FIG. 2).

At a time T4 after elapse of further time, at which the LOW output time period from the crank-angle sensor 13 becomes longer as compared with that during the forward rotation so that the output from the crank-angle sensor 13 changes to the HIGH output, the ECU 22 determines that the engine 1 is in the backward rotation state. Then, the ECU 22 detects the backward rotation state (a first backward rotation signal) of the engine 1 for the first time and therefore sets the computation value of the rotation speed Ne of the engine 1 at the time T4 to zero (part (B) of FIG. 2).

In practice, at the time T4 at which the backward rotation state of the engine 1 is determined, the engine 1 is already rotating backward. Therefore, the computation value should be negative. However, from the time T3 to the time T4, there is no rising signal from the crank-angle sensor 13. Therefore, the ECU 22 cannot determine a time at which the rotation speed Ne becomes zero. Therefore, the time T4 is set as a start time of the backward rotation of the engine 1, and the computation value of the rotation speed Ne is set to zero. Moreover, at the time T4 at which the backward rotation state of the engine 1 is detected, the predetermined value is added to the crank angle and the predetermined value is subtracted from the crank counter CRK (parts (C) and (D) of FIG. 2).

At a time T5, when a second backward rotation signal is input to the ECU 22, the negative rotation speed Ne, that is, the rotation speed Ne in the backward rotation state is computed for the first time (part (B) of FIG. 2). At this time, the addition is performed for the crank angle, whereas the subtraction is performed for the crank counter CRK (parts (C) and (D) of FIG. 2).

When the engine state changes from the backward rotation state to the forward rotation state, the rotation speed at the first crank angle after the change to the forward rotation state occurs is set to zero, whereas the predetermined value is subtracted from the crank angle and the predetermined value is added to the crank counter CRK.

In this manner, the ECU 22 can determine whether the engine 1 is in the forward rotation state or the backward rotation state based on the output signal from the crank-angle sensor 13. As a result, even when the state of the engine 1 changes from the forward rotation state to the backward rotation state or from the backward rotation state to the forward rotation state, the crank angle of the engine 1 and the crank counter CRK can be precisely computed.

Figure 3:
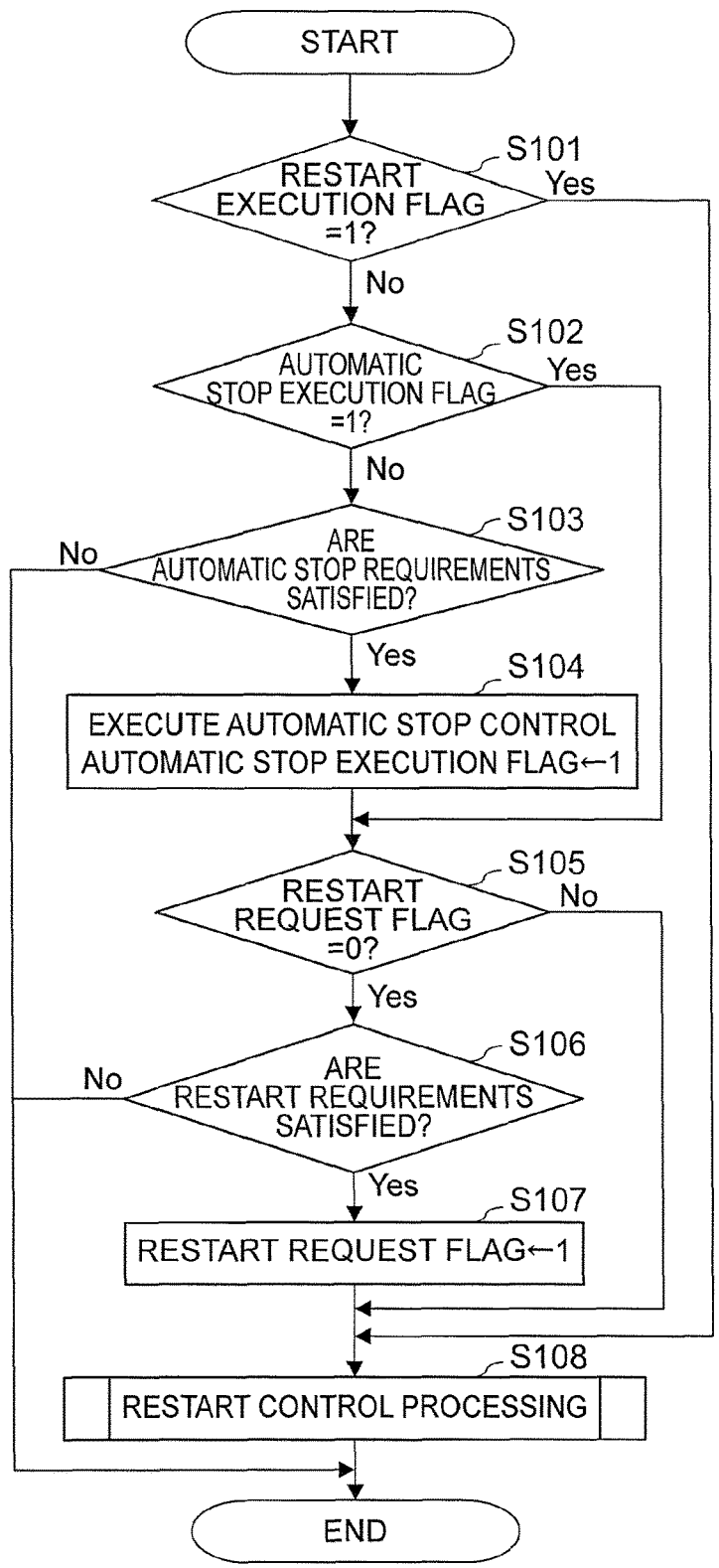
FIG. 3 is a flowchart illustrating an automatic stop/restart operation of the engine according to the first embodiment of the present invention.

Next, referring to flowcharts of FIGS. 3 to 5, 8, and 9, a series of operations performed by the automatic stop/restart device for an internal combustion engine according to the first embodiment of the present invention are described. First, FIG. 3 is a flowchart illustrating an automatic stop/restart operation of the engine 1 according to the first embodiment of the present invention.

First, in Step S101, the ECU 22 makes a determination for a restart execution flag. The restart execution flag is a flag that is set only when restart control processing is executed based on satisfaction of the restart requirements after the execution of automatic stop control to be described later and that is not set when the engine 1 is stopped other than by automatic stop (for example, is stopped by a key-off operation) or when the engine 1 is in a normal operation.

When the engine 1 is stopped other than by the automatic stop or is in the normal operation, the restart execution flag is zero. Therefore, the ECU 22 determines as No in Step S101. Then, the processing proceeds to Step S102. On the other hand, when the restart execution flag is 1, specifically, the restart control processing for the engine 1 is executed, the ECU 22 determines as Yes in Step S101. The processing proceeds to the restart control processing in Step S108 to be described later.

When the processing proceeds to Step S102, the ECU 22 makes a determination for an automatic stop execution flag. The automatic stop execution flag is a flag that is set only when automatic stop control is being executed based on satisfaction of the automatic stop requirements for the engine 1 and that is not set when the engine 1 is stopped other than by the automatic stop or when the engine 1 is in the normal operation.

Therefore, when the automatic stop execution flag is zero in Step S102, the ECU 22 determines that the engine 1 is stopped other than by the automatic stop or is in the normal operation and therefore as No. Then, the processing proceeds to next Step S103. On the other hand, when the automatic stop execution flag is 1 in Step S102, the ECU 22 determines that the automatic stop control is being executed for the engine 1 and therefore as Yes. Then, the processing proceeds to Step S105 to be described later to determine whether or not the restart requirements are satisfied.

When the processing proceeds to Step S103, the ECU 22 determines whether or not the automatic stop requirements are satisfied. As the automatic stop requirements, a combination of the following is described as an example:

(1) whether or not the temperature detected by the water-temperature sensor is equal to or higher than a predetermined temperature (for example, 65 degrees);

(2) whether or not a vehicle speed equal to or higher than a predetermined speed (for example, 15 km/h) has been detected at least once;

(3) whether or not a current vehicle speed is equal to or lower than a predetermined speed (for example, 0 km/h); and (4) various kinds of information on the deceleration or stop operation performed by the driver, such as whether or not the brake pedal is currently depressed and whether or not the amount of depression of the accelerator pedal is equal to or smaller than a predetermined value (for example, the amount of depression is zero).

The ECU 22 collectively determines the requirements (1) to (4) described above so as to determine whether or not the automatic stop requirements are satisfied.

When the automatic stop requirements are satisfied in Step S103, the ECU 22 determines as Yes. Then, the processing proceeds to Step S104 where the automatic stop control is executed and the automatic stop execution flag is set to 1. Thereafter, the processing proceeds to next Step S105. Here, as the automatic stop control to be executed in Step S104, the following is described:

(1) stop the drive signal to the fuel injection valve 12 to stop the fuel supply to the engine 1; and (2) along with the processing (1), for example, change a control amount for the throttle valve 6 or release a clutch of a transmission mounted to the engine 1.

On the other hand, when the automatic stop requirements are not satisfied in Step S103, the ECU 22 determines as No and terminates the automatic stop/restart processing in this step. Specifically, even if a driver performs the deceleration or stop operation, at least one of the automatic stop requirements to be determined collectively by the ECU 22 is not satisfied. Therefore, the automatic stop control is not executed in Step S104 and the series of operations is terminated in this step.

When the processing proceeds to Step S105, the ECU 22 makes a determination for a restart request flag. The restart request flag used for the determination is a flag that is set to 1 when restart requirements to be described later are satisfied and that is set to zero with the completion of the restart of the engine 1. The restart request flag remains unchanged when the restart requirements are not satisfied.

In a case where Step S105 is executed for the first time, the determination on whether or not the restart requirements are satisfied is not made yet. Therefore, the restart request flag is zero. Therefore, in Step S105, the ECU 22 determines as Yes. Then, the processing proceeds to Step S106. On the other hand, in a case where Step S105 is executed after the satisfaction of the restart requirements, the restart request flag is set to 1. Therefore, after Step S105, the ECU 22 proceeds to the restart control processing of Step S108.

When the processing proceeds to Step S106, the ECU 22 determines whether or not the restart requirements are satisfied. As the restart requirements, a combination of the following is described as an example:

(1) various kinds of information for determining the intention of the driver to start the vehicle, such as whether or not the amount of depression of the brake pedal is equal to or smaller than a predetermined value (for example, the amount of depression is zero) and whether or not the amount of depression of the accelerator pedal is equal to or larger than a predetermined value (for example, the amount of depression of ten percent or more with respect to zero amount of depression); and (2) a state of the battery 21 for supplying the electric power to the sensors provided to the engine 1, such as the intake-air temperature sensor 3.

The ECU 22 collectively determines the requirements (1) and (2) described above so as to determine whether or not the restart requirements are satisfied.

When the restart requirements are satisfied in Step S106, the ECU 22 determines as Yes. Then, the processing proceeds to Step S107 where the restart request flag is set to 1. Further, the processing proceeds to Step S108 where the ECU 22 executes the restart control processing. Then, the automatic stop/restart processing is terminated in this step.

On the other hand, when at least one of the restart requirements is not satisfied in Step S106, the ECU 22 determines as No and terminates the automatic stop/restart processing in this step. Specifically, when the restart requirements are not satisfied, the ECU 22 determines that the driver does not intend to start the vehicle yet (or the state of the battery 21 does not satisfy a predetermined condition) and therefore continues the automatic stop control that is being executed.

Figure 4:
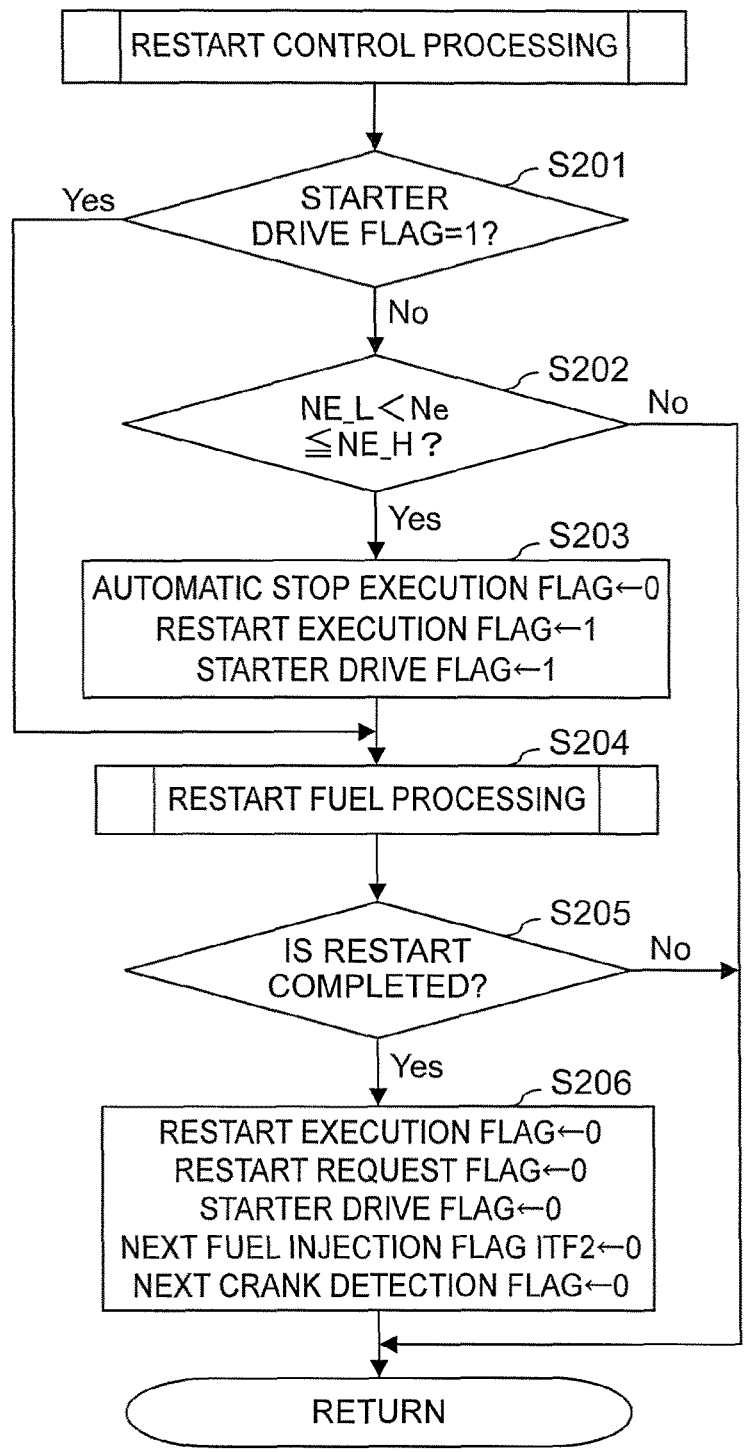
FIG. 4 is a flowchart of restart control processing according to the first embodiment of the present invention.

Next, the restart control processing to be executed in Step S108 is described. FIG. 4 is a flowchart of the restart control processing according to the first embodiment of the present invention.

When the restart control processing is executed, the ECU 22 first determines in Step S201 whether or not the starter 15 is currently being driven based on a starter drive flag. The starter drive flag used for the determination is a flag that is set to 1 when the starter 15 is currently being driven after the satisfaction of the restart requirements, that is, when the cranking of the engine 1 is started. In the present invention, other control at the restart is executed based on the start of driving of the starter 15. Therefore, the determination in Step S201 is first made.

When the ECU 22 determines as Yes in Step S201, the starter 15 is being driven to execute restart fuel processing to be described later. Therefore, the processing proceeds to Step S204. On the other hand, when the ECU 22 determines as No in Step S201, the starter 15 is not driven although the restart requirements are satisfied. Therefore, the processing proceeds to Step S202 for determination of driving allowance.

When the processing proceeds to Step S202, the ECU 22 determines whether or not to allow driving of the starter 15. Timing at which the restart requirements are satisfied depends on the driver. In the case of the satisfaction of the restart requirements during the rotation by inertia, a value that the rotation speed Ne of the engine 1 can have cannot be predicted.

Moreover, as described above, the pinion gear 17 comes into meshing engagement with the ring gear 16 to turn ON the contact point, to thereby start the energization of the starter motor 20 to start the rotational driving of the starter 15. Specifically, at the start and restart, the pinion gear 17 of the starter 15 in a non-rotation state comes into meshing engagement with the ring gear 16 of the engine 1. Therefore, if a rotation speed of the ring gear 16 is out of a range of a predetermined rotation speed, it becomes difficult for the pinion gear 17 to come into meshing engagement with the ring gear 16.

Therefore, a determination on whether or not the starter 15 can be driven, specifically, whether or not the ring gear 16 is in the range of the rotation speed in which the meshing engagement of the pinion gear 17 with the ring gear 16 is possible is made in Step S202. The ring gear 16 of the engine 1 is coupled to the crankshaft of the engine 1 and the rotation speed of the ring gear 16 becomes equivalent to the rotation speed Ne of the engine 1. Therefore, in Step S202, by using the rotation speed Ne of the engine 1, whether or not the starter 15 can be driven is determined.

More specifically, in Step S202 illustrated in FIG. 4, it is determined whether or not the rotation speed Ne of the engine 1 falls within a range between a drive allowance lower limit rotation speed Ne_L (for example, −40 r/min) of the starter 15 and a drive allowance upper limit rotation speed Ne_H (for example, 80 r/min).

When the ECU 22 determines as Yes in Step S202, specifically, determines that the rotation speed Ne of the engine 1 falls within the range of the rotation speed in which the starter 15 can be driven, the processing proceeds to Step S203.

On the other hand, when the ECU 22 determines as No in Step S202, specifically, determines that the rotation speed Ne of the engine 1 is out of the range of the rotation speed in which the starter 15 can be driven and therefore is in a high state or is in a backward rotation state at a large angle, the starter 15 cannot be driven. Therefore, the processing returns to terminate the restart control processing in this step.

When the processing proceeds to Step S203, the ECU 22 sets the automatic stop execution flag to zero and the restart execution flag to 1 so as to interrupt the automatic stop to perform the restart so that the drive signal is transmitted to the starter 15 through the drive circuit, and sets the starter drive flag to 1. Then, the processing proceeds to Step S204.

When the processing proceeds to Step S204, the ECU 22 executes the restart fuel processing to set a fuel amount during the restart. The restart fuel processing of Step S204 is executed in accordance with a flowchart illustrated in FIG. 5 to be referred to later. The details thereof are described after the description referring to FIG. 4.

After the restart fuel processing is executed in Step S204, the processing proceeds to Step S205 where the ECU 22 determines whether or not the restart is completed. The ECU 22 can make the restart completion determination based on an operating state of the engine 1 during the restart. For example, the ECU 22 makes the restart completion determination based on whether or not a rotation speed Nec of the engine 1, which is computed for each predetermined crank angle (for example, 60 degrees before TDC) after the restart execution flag is set to 1, is equal to or higher than a predetermined rotation speed (for example, 500 r/min).

When it is determined as Yes in Step S205, the ECU 22 determines that the engine 1 can perform a self-sustained operation. Then, the processing proceeds to Step S206. On the other hand, when it is determined as No in Step S205, the ECU 22 determines that the restart control is required to be continued. Therefore, the restart control processing is terminated in this step, and the processing returns.

When the processing proceeds to Step S206, the restart of the engine 1 is completed. Therefore, the ECU 22 sets the restart execution flag, the restart request flag, and the starter drive flag to zero and stops the driving of the starter 15. Then, the processing returns. Moreover, a next fuel injection flag ITF2 and an initial crank detection flag are also set to zero. The next fuel injection flag ITF2 is described in detail in the description referring to FIG. 5, whereas the initial crank detection flag is described in detail in the description referring to FIG. 8.

Figure 5:
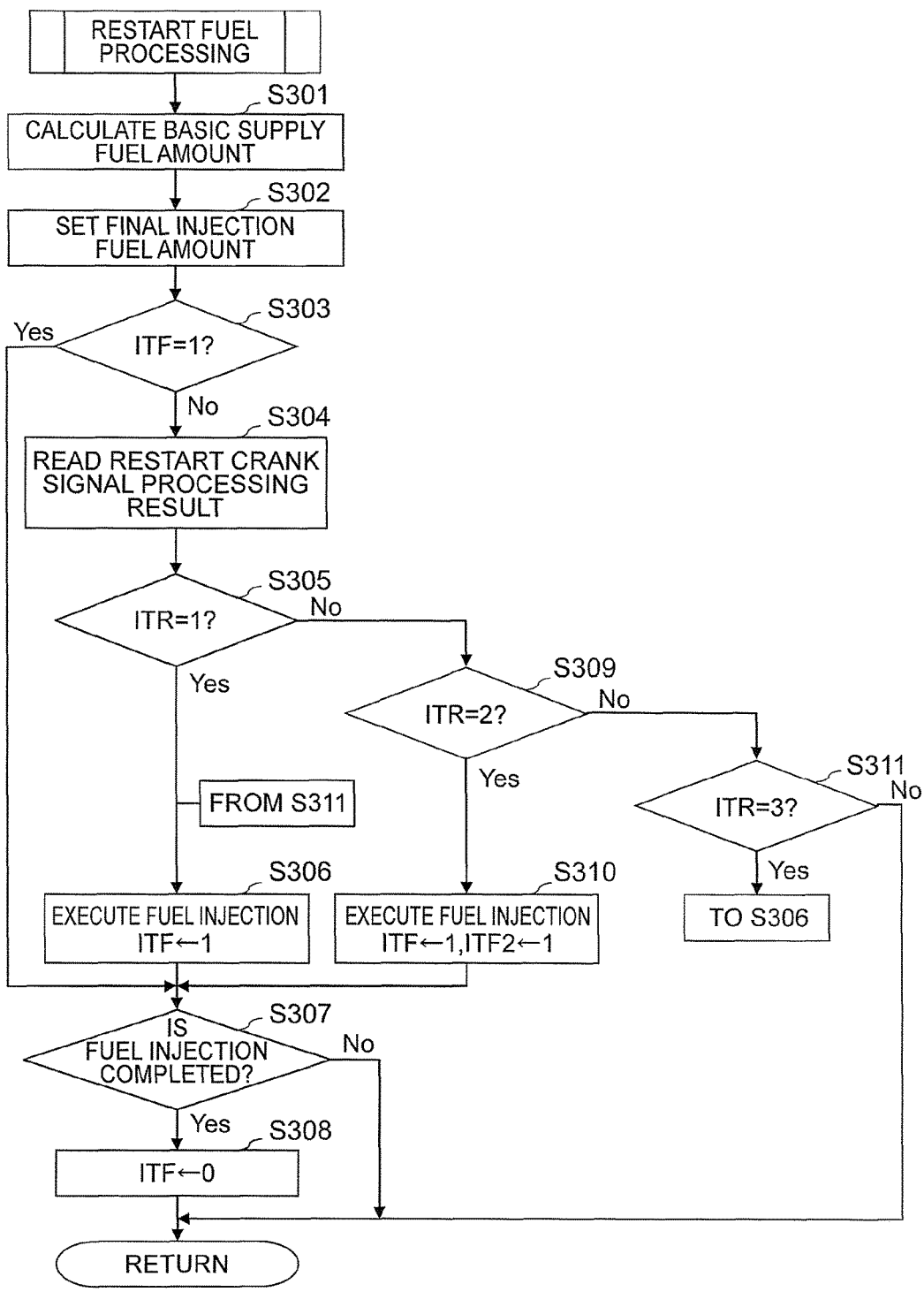
FIG. 5 is a flowchart of restart fuel processing according to the first embodiment of the present invention.

Next, the restart fuel processing to be executed in Step S204 of FIG. 4 is described. FIG. 5 is a flowchart of the restart fuel processing according to the first embodiment of the present invention. When the processing proceeds to Step S204 after the execution of the processing of Step S203 of FIG. 4, the restart fuel processing illustrated in FIG. 5 is executed.

First, in Step S301, the ECU 22 calculates a basic supply fuel amount at the time of restart. The basic supply fuel amount is calculated from a basic supply fuel amount map based on the cooling water temperature for the engine 1, which is preset in the ECU 22. FIG. 6 shows the basic supply fuel amount map based on the cooling temperature at the time of restart of the internal combustion engine according to the first embodiment of the present invention.

When the processing proceeds to Step S301, the ECU 22 first reads the cooling water temperature for the engine 1 and calculates the basic supply fuel amount corresponding to the read cooling water temperature by using the basic supply fuel amount map of FIG. 6.

Next, in Step S302, the ECU 22 corrects the basic supply fuel amount calculated in Step S301 to set a final injection fuel amount to be supplied from the fuel injection valve 12 to the engine 1. The setting of the final injection fuel amount is executed based on the state of the engine 1 during the restart, and is executed based on the intake-pipe pressure, for example. FIG. 7 shows a correction coefficient map based on the intake-pipe pressure at the time of restart of the internal combustion engine according to the first embodiment of the present invention.

When the processing proceeds to Step S302, the ECU 22 first reads the output signal from the intake-pipe pressure sensor 8 and calculates the correction coefficient corresponding to the read intake-pipe pressure by using the correction coefficient map of FIG. 7. Further, the ECU 22 corrects the basic supply fuel amount by using the calculated correction coefficient to obtain the final injection fuel amount, and executes processing for converting the final injection fuel amount into an actuation time period of the fuel injection valve 12.

Then, after the setting of the final injection fuel amount is finished, the processing proceeds to Step S303 where the ECU 22 makes a determination for a fuel injection flag ITF. The fuel injection flag ITF is set after the execution of fuel injection to be described later and becomes zero with the termination of the fuel injection. When the restart fuel processing is executed for the first time, the fuel injection is not executed yet. Therefore, the processing proceeds to Step S304. On the other hand, when the fuel injection is being executed, the processing proceeds to Step S307.

When the processing proceeds to Step S304, the ECU 22 reads the result of restart crank signal processing. The restart crank signal processing to be read in Step S304 is described. The restart crank signal processing is executed each time the output signal from the crank-angle sensor 13 is input to the ECU 22. Although the ECU 22 executes various types of processing for each output signal from the crank-angle sensor 13, only a part of processing at the time of restart that relates to the present invention is described.

Figure 8:
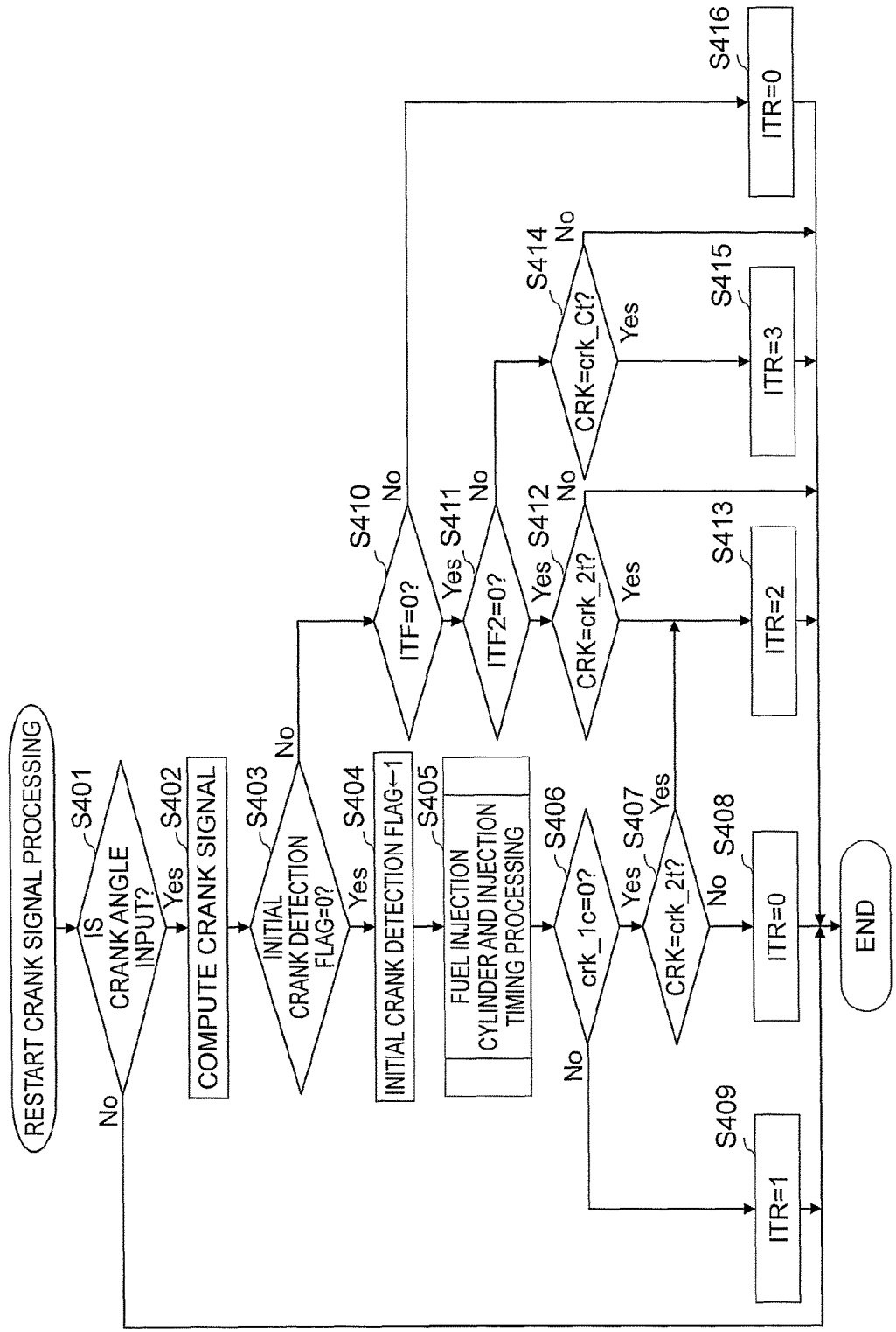
FIG. 8 is a flowchart of restart crank signal processing according to the first embodiment of the present invention.

FIG. 8 is a flowchart of the restart crank signal processing according to the first embodiment of the present invention. When the restart crank signal processing is executed, the ECU 22 first inputs the output signal from the crank-angle sensor 13 as the crank signal in Step S401 to make a determination for the crank signal. The ECU 22 makes the determination based on input of the falling signal and the rising signal of the crank signal described above referring to FIG. 2.

More specifically, when the falling signal and the rising signal are detected, the ECU 22 determines that the crank signal is input and therefore determines as Yes. Then, the processing proceeds to Step S402. On the other hand, when no falling signal or rising signal is detected, the ECU 22 terminates the series of operations.

When the processing proceeds to Step S402, the ECU 22 computes a time difference between a time that is stored in the RAM when the falling signal is input and a time that is stored in the RAM when the rising signal is input. Further, the ECU 22 compares the time difference and a forward rotation reference time (for example, 50 μsec) of the engine 1 to determine which of the forward rotation state and the backward rotation state the engine 1 is in. Specifically, the ECU 22 determines that the engine 1 is in the forward rotation state when the time difference between the falling signal and the rising signal is equal to or shorter than the forward rotation reference time and determines that the engine 1 is in the backward rotation state when the time difference is longer than the forward rotation reference time.

Further, the crank-angle signal is input at every predetermined angle (for example, 10 degrees). Therefore, the ECU 22 calculates the rotation speed Ne of the engine 1 by using the predetermined angle and an input time difference between a current crank-angle signal and a previous crank-angle signal. Further, the ECU 22 calculates the crank angle and the crank counter CRK at that time based on the input crank signal. Further, as described above, the ECU 22 also executes processing in a case where the backward rotation state is detected for the first time.

In the first embodiment of the present invention, the crank angle is computed so as to become the maximum value at the initial output signal from the crank-angle sensor 13 after the compression TDC, using the compression TDC of each of the cylinders of the engine 1 as a reference (=0 (zero) degrees). Before the next compression TDC, the predetermined angle is subtracted from the crank angle in the case of the forward rotation state and is added to the crank angle in the case of the backward rotation state. Moreover, the crank counter CRK is computed so as to become an initial value (=0 (zero)) with one stroke (intake, compression, combustion, or exhaust) of the first cylinder of the engine 1, specifically, two revolutions of the crankshaft, using, for example, the compression TDC of the first cylinder of the engine 1 as a reference (=0 (zero)). For each output signal from the crank-angle sensor 13, the predetermined value (for example, 1) is added thereto in the forward rotation state and is subtracted therefrom in the backward rotation state.

After the ECU 22 processes the output signal from the crank-angle sensor 13, the processing proceeds to Step S403 where whether or not the initial crank signal can be detected is determined by using the initial crank detection flag. The initial crank detection flag is a flag that is set to 1 when the crank signal is input after the restart execution flag is set to 1 and that is set to zero with the completion of the restart.

In a case where Step S403 is executed for the first time, the initial crank detection flag is zero. Therefore, it is determined as Yes. Then, the processing proceeds to Step S404. In Step S403, the input crank signal is the initial crank signal at the time of restart control. Therefore, the ECU 22 sets the initial crank detection flag to 1. Then, the processing proceeds to Step S405 where fuel injection cylinder and injection timing processing is executed.

When the flowchart illustrated in FIG. 8 is executed for the next time, specifically, when a second crank signal is input during the restart control, the initial crank is already detected. Therefore, the initial crank detection flag is 1. Thus, it is determined as No in Step S403. Then, the processing proceeds to Step S410.

Figure 9:
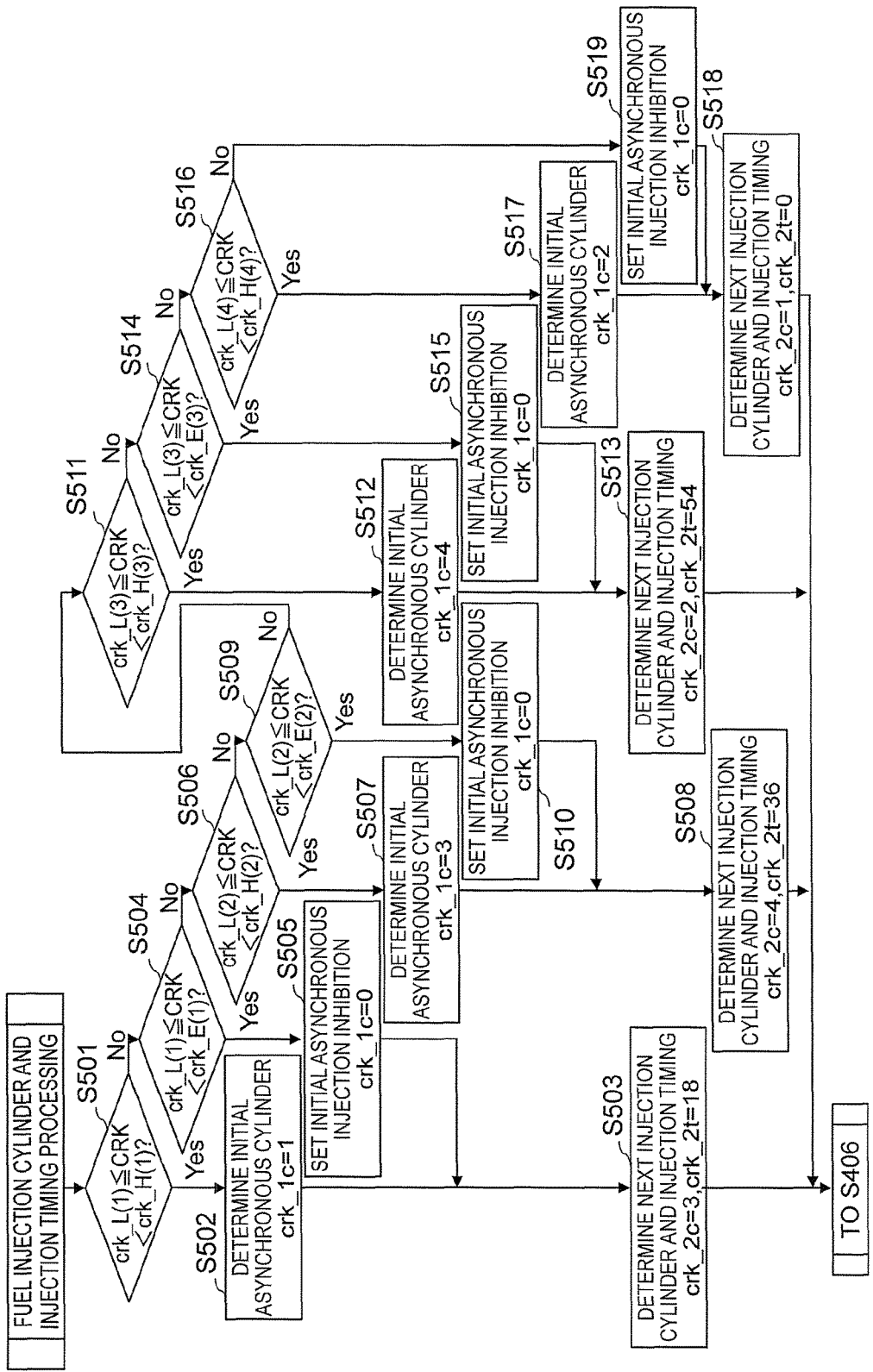
FIG. 9 is a flowchart of fuel injection cylinder and injection timing processing included in the restart crank signal processing according to the first embodiment of the present invention.

Now, the fuel injection cylinder and injection timing processing to be executed in Step S405 is described. FIG. 9 is a flowchart of the fuel injection cylinder and injection timing processing included in the restart crank signal processing according to the first embodiment of the present invention. When the processing proceeds to Step S405 after the execution of the processing of Step S404 illustrated in FIG. 8, the fuel injection cylinder and fuel timing processing illustrated in FIG. 9 is executed. The fuel injection cylinder and fuel timing processing is processing that is executed only when the initial crank detection flag is zero.

When the fuel injection cylinder and injection timing processing is executed, the ECU 22 first determines in Step S501 whether or not the initial crank counter computation value CRK computed in Step S402 falls within a first fuel supply range.

Specifically, the ECU 22 determines whether or not the initial crank counter computation value CRK is present between a first fuel supply range lower limit value crk_L(1) and a first fuel supply range upper limit value crk_H(1). The fuel supply range lower limit value and the fuel supply range upper limit value are set in advance in the ROM included in the ECU 22. FIG. 10 shows a fuel supply range map for the internal combustion engine according to the first embodiment of the present invention, showing a fuel supply range map stored in the ROM included in the ECU 22 in a case where, for example, the engine 1 has four cylinders.

In Step S501, when the initial crank counter computation value CRK is present between the first fuel supply range lower limit value crk_L(1) and the first fuel supply range upper limit value crk_H(1), the ECU 22 determines as Yes. Then, the processing proceeds to Step S502. When the initial crank counter computation value CRK is not present within the above-mentioned range, the ECU 22 determines as No. Then, the processing proceeds to Step S504.

When it is determined as Yes in Step S501, there is a cylinder that is in an intake stroke during which the fuel can be supplied at the initial crank counter computation value CRK. Therefore, in Step S502, the ECU 22 sets an initial asynchronous injection cylinder crk_1c to 1 (indicating the first cylinder). Further, the processing proceeds to Step S503 where the ECU 22 sets a next injection cylinder crk_2c to 3 (third cylinder) and an injection timing crk_2t to 18. Then, the processing proceeds to Step S406 of FIG. 8.

On the other hand, when it is determined as No in Step S501, the processing proceeds to Step S504 where the ECU 22 determines whether or not the initial crank counter computation value CRK is a crank counter value for a next intake stroke. When it is determined as No in Step S501, there is no cylinder that is present within the first fuel supply range with the initial crank counter computation value CRK. Therefore, the initial asynchronous injection cannot be executed.

However, before the start of the next intake stroke of the cylinder that next enters the intake stroke, the fuel injection is restarted for the cylinder at the start of the intake stroke. Therefore, in Step S504, the ECU 22 determines whether or not the initial crank counter computation value CRK is present between the first fuel supply range upper limit value crk_H(1) and a next intake stroke start crank counter crk_E (1).

When it is determined as Yes in Step S504, it is before the start of the intake stroke of the cylinder that next enters the intake stroke. Therefore, the fuel injection is restarted at the start of the intake stroke of the cylinder. Therefore, the processing proceeds to Step S505 where the ECU 22 sets inhibition of an initial asynchronous injection cylinder (crk_1c=0). Further, the processing proceeds to Step S503 where the ECU 22 sets the next injection cylinder crk_2c to 3 (third cylinder) and the injection timing crk_2t to 18. Then, the processing proceeds to Step S406 of FIG. 8.

On the other hand, when it is determined as No in Step S504, the ECU 22 determines that the initial asynchronous injection within the first fuel supply range and the fuel injection to be started at the start of the intake stroke of the cylinder that next enters the intake stroke cannot be executed. Therefore, the processing proceeds to Step S506.

When the processing proceeds to Step S506, the ECU 22 makes a similar determination to that in Step S501. In Step S506, however, the ECU 22 makes a determination by using a second fuel supply range, specifically, a second fuel supply lower limit value crk_L(2) and a second fuel supply upper limit value crk_H(2).

In Step S506, when the initial crank counter computation value CRK is present within the range between the second fuel supply lower limit value crk_L(2) and the second fuel supply upper limit value crk_H(2), the ECU 22 determines as Yes. Then, the processing proceeds to Step S507. Then, in Step S507, the ECU 22 sets the initial asynchronous injection cylinder crk_1c to 3 (indicating the third cylinder). Further, the processing proceeds to Step S508 where the ECU 22 sets the next injection cylinder crk_2c to 4 (fourth cylinder) and the injection timing crk_2t to 36. Then, the processing proceeds to Step S406 of FIG. 8.

On the other hand, when it is determined as No in Step S506, the processing proceeds to Step S509 where the ECU 22 determines whether or not the initial crank counter computation value CRK is present within the range between the second fuel supply range upper limit value crk_H(2) and a next intake stroke start crank counter crk_E(2).

When it is determined as Yes in Step S509, it is before the start of the intake stroke of the cylinder that next enters the intake stroke. Therefore, the fuel injection is restarted at the start of the intake stroke of the cylinder. Therefore, the processing proceeds to Step S510 where the ECU 22 sets the inhibition of the initial asynchronous injection cylinder (crk_1c=0). Further, the processing proceeds to Step S508 where the ECU 22 sets the next injection cylinder crk_2c to 4 (fourth cylinder) and the injection timing crk_2t to 36. Then, the processing proceeds to Step S406 of FIG. 8.

On the other hand, when it is determined as No in Step S509, the ECU 22 determines that the initial asynchronous injection within the second fuel supply range and the fuel injection to be started at the start of the intake stroke of the cylinder that next enters the intake stroke cannot be executed. Then, the processing proceeds to Step S511.

When the processing proceeds to Step S511, the ECU 22 determines whether or not the initial crank counter computation value CRK is present in a third fuel supply range (specifically, in a range between a third fuel supply lower limit value crk_L(3) and a third fuel supply upper limit value crk_H(3)).

In Step S511, when the initial crank counter computation value CRK is present in the range between the third fuel supply lower limit value crk_L(3) and the second fuel supply upper limit value crk_H(3), the ECU 22 determines as Yes. Then, the processing proceeds to Step S512. In Step S512, the ECU 22 sets the initial asynchronous injection cylinder crk_1c to 4 (indicating the fourth cylinder). Further, the processing proceeds to Step S513 where the ECU 22 sets the next injection cylinder crk_2c to 2 (second cylinder) and the injection timing crk_2t to 54. Then, the processing proceeds to Step S406 of FIG. 8.

On the other hand, when it is determined as No in Step S511, the processing proceeds to Step S514 where the ECU 22 determines whether or not the initial crank counter computation value CRK is present in the range between the third fuel supply range upper limit value crk_H(3) and a next intake stroke start crank counter crk_E(3).

When it is determined as Yes in Step S514, it is before the start of the intake stroke of the cylinder that next enters the intake stroke. Therefore, the fuel injection is restarted at the start of the intake stroke of the cylinder. Therefore, the processing proceeds to Step S515 where the ECU 22 sets the inhibition of the initial asynchronous injection (crk_1c=0). Further, the processing proceeds to Step S513 where the ECU 22 sets the next injection cylinder crk_2c to 2 (second cylinder) and the injection timing crk_2t to 54. Then, the processing proceeds to Step S406 of FIG. 8.

On the other hand, when it is determined as No in Step S514, the ECU 22 determines that the initial asynchronous injection within the third fuel supply range and the fuel injection to be started at the start of the intake stroke of the cylinder that next enters the intake stroke cannot be executed. Then, the processing proceeds to Step S516.

When the processing proceeds to Step S516, the ECU 22 determines whether or not the initial crank counter computation value CRK is present in a fourth fuel supply range (specifically, in a range between a fourth fuel supply lower limit value crk_L(4) and a fourth fuel supply upper limit value crk_H(4)).

When it is determined as Yes in Step S516, the processing proceeds to Step S517 where the ECU 22 sets the initial asynchronous injection cylinder crk_1c to 2. Further, the processing proceeds to Step S518 where the ECU 22 sets the next injection cylinder crk_2c to 1 (first cylinder) and the injection timing crk_2t to 0 (zero). Then, the processing proceeds to Step S406 of FIG. 8.

On the other hand, when it is determined as No in Step S516, the initial asynchronous injection within the fourth fuel supply range cannot be executed. Therefore, the processing proceeds to Step S519. Then, in Step S519, the ECU 22 sets the inhibition of the initial asynchronous injection cylinder (crk_1c=0). Further, the processing proceeds to Step S518 where the ECU 22 sets the next injection cylinder crk_2c to 1 (first cylinder) and the injection timing crk_2t to 0 (zero). Then, the processing proceeds to Step S406 of FIG. 8.

Through the fuel injection cylinder and injection timing processing described above, whether or not the initial asynchronous injection can be executed and the injection cylinder in accordance with the initial crank counter computation value CRK are determined, and the injection cylinder and the injection timing of the cylinder that next enters the intake stroke are determined. Further, constants used in the fuel injection cylinder and injection timing processing are, for example, prestored in the ROM included in the ECU 22 as illustrated in FIG. 10.

Returning to FIG. 8, after the fuel injection cylinder and injection timing processing is terminated in Step S405, the processing proceeds to Step S406 where the ECU 22 makes a determination for setting of the initial asynchronous injection cylinder. The determination is made based on the value of the initial asynchronous injection cylinder crk_1c that is determined in the fuel injection cylinder and injection timing processing executed in Step S405.

Specifically, when the initial asynchronous injection cylinder crk_1c is other than zero (has a value of any one of 1, 2, 3, and 4 in the case of the first embodiment of the present invention), the ECU 22 determines that the initial asynchronous injection can be executed. When the initial asynchronous injection cylinder crk_1c is zero, the ECU 22 determines that the initial asynchronous injection is not executed. When the initial asynchronous injection cylinder crk_1c is set to the value other than zero, the processing proceeds to Step S409 where the ECU 22 sets an injection timing flag ITR to 1. Then, the restart crank signal processing is terminated.

On the other hand, when the initial asynchronous injection cylinder crk_1c is zero, the processing proceeds to Step S407. In Step S407, the ECU 22 determines whether or not the initial crank counter computation value CRK indicates the next injection timing.

In the first embodiment of the present invention, the restart fuel processing is executed after the starter 15 is driven. The driving of the starter 15 is allowed only after the restart requirements are satisfied (after the restart request flag is set to 1) and only when the rotation speed Ne of the engine 1 is present within the starter drive allowance rotation speed range (between Ne_L and Ne_H). However, the rotation speed Ne of the engine 1 after the automatic stop does not always exhibit the same decreasing behavior. Therefore, the drive start timing of the starter 15 differs for each restart.

Therefore, the initial crank counter computation value CRK after the execution of the restart can have a different value for each restart. Hence, there are some cases where the initial crank counter computation value CRK matches with the next injection timing crk_2t. Therefore, in the first embodiment of the present invention, the determination in Step S407 is made so as to determine whether or not the initial crank counter computation value CRK indicates the next injection timing crk_2t.

When the initial crank counter computation value CRK matches with the next injection timing crk_2t in Step S407, it is determined as Yes. Then, the processing proceeds to Step S413 where the ECU 22 sets the injection timing flag ITR to 2. Then, the series of processing is terminated. On the other hand, when the initial crank counter computation value CRK does not match with the next injection timing crk_2t in Step S407, it is determined as No. Then, the processing proceeds to Step S408 where the ECU 22 sets the injection timing flag ITR to zero. Then, the series of processing is terminated. As described above, the initial crank signal at the time of restart is processed.

On the other hand, when the crank signal is input for the next time, Steps S401 and S402 are executed. Then, when the processing proceeds to Step S403, the initial crank detection flag is set to 1. Therefore, the processing proceeds to Step S410 where the ECU 22 makes a determination for the fuel injection flag ITF. The fuel injection flag ITF is a flag that is set only when the fuel injection is currently being executed, and the details thereof are described later.

When the fuel injection is currently being executed, specifically, the fuel injection flag ITF is 1, it is determined as No. Then, the processing proceeds to Step S416 where the ECU 22 sets the injection timing flag ITR to zero. Then, the series of processing is terminated.

On the other hand, when it is determined as Yes in Step S410, the fuel injection is terminated. Therefore, the processing proceeds to Step S411 where the ECU 22 makes a determination for the next fuel injection flag ITF2. The next fuel injection flag ITF2 in the present invention is a flag that is set only when the fuel injection is executed at the start of the intake stroke of the cylinder that is in a transition from the exhaust stroke to the intake stroke after the initially detected crank angle and that is set to zero with the completion of the restart. The details thereof are described later.

When the next fuel injection flag ITF2 is not zero in Step S411, the next fuel injection has already been executed. Therefore, it is determined as No, and the processing proceeds to Step S414.

On the other hand, when the next fuel injection is not executed yet, it is determined as Yes. Therefore, the processing proceeds to Step S412. Then, in Step S412, the ECU 22 determines whether or not the crank counter CRK computed in Step S402 matches with the next fuel injection timing crk_2t set in Step S405 each time the restart crank signal processing is executed.

When the crank counter CRK matches with the next fuel injection timing crk_2t in Step S412, it is determined as Yes. Then, the processing proceeds to Step S413 where the ECU 22 sets the injection timing flag ITR to 2. Then, the series of processing is terminated. On the other hand, when the crank counter CRK does not match with the next fuel injection timing crk_2t in Step S412, specifically, it is not the next injection timing, it is determined as No. Then, the series of processing is terminated.

Further, in a case where it is determined as No in Step S411 and the processing proceeds to Step S414, the ECU 22 determines whether or not the crank counter CRK is a predetermined crank counter crk_Ct. A value of the predetermined crank counter crk_Ct that is used for the determination in Step S414 can be prestored in the ROM included in the ECU 22.

FIG. 11 shows a predetermined crank counter map for the internal combustion engine according to the first embodiment of the present invention. For example, as shown in FIG. 11, the crank counter value and the injection cylinder are preset. In this manner, a value of the predetermined crank counter crk_Ct can be set for each injection cylinder.

When the crank counter CRK matches with the predetermined crank counter crk_Ct in Step S414, the processing proceeds to Step S415 where the ECU 22 sets the injection timing flag ITR to 3 as the injection timing of synchronous injection. Then, the series of processing is terminated. On the other hand, when the crank counter CRK is not the predetermined crank counter crk_Ct, it is not the injection timing of the synchronous injection. Therefore, the ECU 22 determines as No. Then, the series of processing is terminated.

In the manner described above, the output signal from the crank-angle sensor 13 at the time of restart is processed. The processed signal is used in Step S304 of FIG. 5. Therefore, returning to FIG. 5, the description is restarted.

In Step S304, the ECU 22 reads the result of the restart crank signal processing described above referring to FIGS. 8 and 9, and makes the determination for the injection timing flag ITR in Steps S305, S309, and S311 so as to determine whether or not the fuel injection can be executed.

Specifically, the determination as Yes in Step S305 corresponds to the presence of the cylinder into which the initial asynchronous injection can be executed based on the initially detected crank signal. Therefore, the processing proceeds to Step S306 where the ECU 22 executes the fuel injection into the cylinder to execute the asynchronous injection, and sets the fuel injection flag ITF to 1. Then, the processing proceeds to Step S307.

On the other hand, the determination as No in Step S305 corresponds to a case where the initial asynchronous injection has already been executed or the initial asynchronous injection is inhibited. Therefore, the processing proceeds to Step S309.

Then, the determination as Yes in Step S309 corresponds to the crank angle at the start of the intake stroke of the cylinder that next enters the intake stroke. Therefore, the processing proceeds to Step S310 where the ECU 22 starts the fuel injection into the corresponding cylinder, and sets the fuel injection flag ITF and the next fuel injection flag ITF2 to 1. Then, the processing proceeds to Step S307.

Here, the next fuel injection flag ITF2 is a flag that is set only when the fuel injection is executed at the next timing (specifically, a timing corresponding to the start of the intake stroke of the cylinder that is in a transition from the exhaust stroke to the intake stroke in the present invention) and that is set to zero with the completion of restart (set to zero in Step S206 of FIG. 4).

On the other hand, when the initial asynchronous injection is executed, an execution flag is not provided. The reason is as follows. Only when the initial crank detection flag at the time of restart is not set (only when the initial crank signal is detected) in Step S403 of FIG. 8, the processing proceeds to Step S404 and subsequent steps. Therefore, there exists only one timing at which the injection timing flag ITF can be set to 1 during the restart. Therefore, the initial asynchronous injection execution flag is not provided intentionally.

Although the setting of the next injection timing is executed only once, the number of injection timings is not limited to one during the restart. Therefore, the fuel injection flag ITF2 is provided so that the injection is executed only once during the restart.

On the other hand, when it is determined as No in Step S309, the fuel injection based on the injection timing flag ITR set to 2, that is, the fuel injection at the start of the intake stroke of the cylinder that is in a transition from the exhaust stroke to the intake stroke has already been executed. Therefore, the processing proceeds to Step S311.

Then, when it is the fuel injection timing of the synchronous injection in Step S311, it is determined as Yes. Then, the processing proceeds to Step S306. Then, in Step S306, the ECU 22 executes the fuel injection and sets the fuel injection flag ITF to 1. Then, the processing proceeds to Step S307. On the other hand, when it is determined as No in Step S311, it does not correspond to the fuel injection timing. Therefore, the ECU 22 terminates the restart fuel processing in this step.

When the processing proceeds to Step S307, the ECU 22 makes a determination for fuel injection completion. The ECU 22 makes the determination based on whether or not the actuation time of the fuel injection valve 12 for injecting the final injection fuel amount, which is set in Step S302, has elapsed. The determination as Yes in Step S307 corresponds to the injection of the set final injection fuel amount to the engine 1. Therefore, the processing proceeds to Step S308.

The fuel supply from the fuel injection valve 12 to the engine 1 is completed in Step S308. Therefore, the ECU 22 sets the fuel injection flag ITR to zero and terminates the restart fuel processing.

On the other hand, the determination as No in Step S307 corresponds to a case where the fuel is still being injected from the fuel injection valve 12. Therefore, the ECU 22 terminates the restart fuel processing in this step, and the processing returns.

Figure 12:
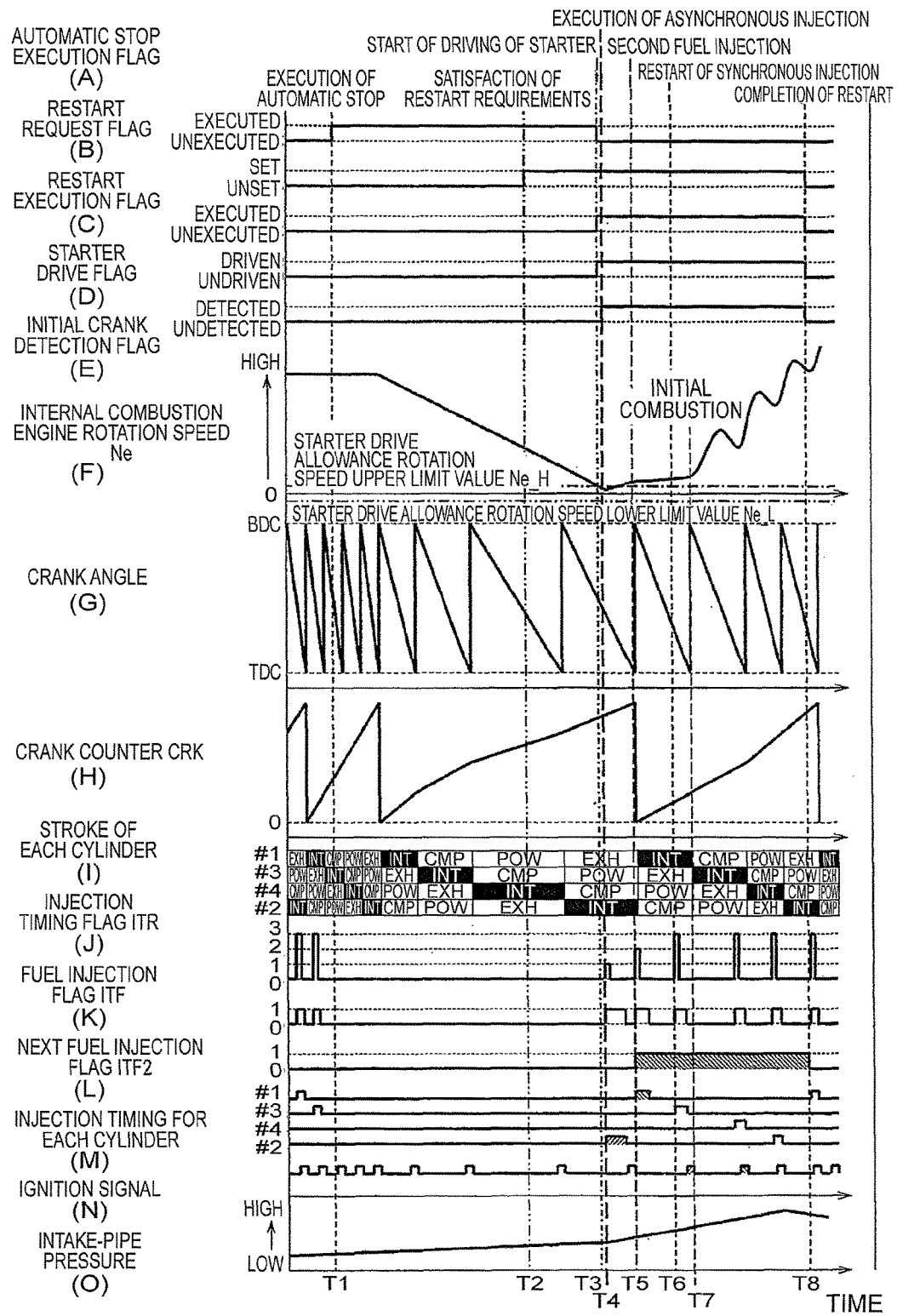
FIG. 12 is a timing chart in a case where initial asynchronous injection is executed after a restart request in the automatic stop/restart device for an internal combustion engine according to the first embodiment of the present invention.
Figure 13:
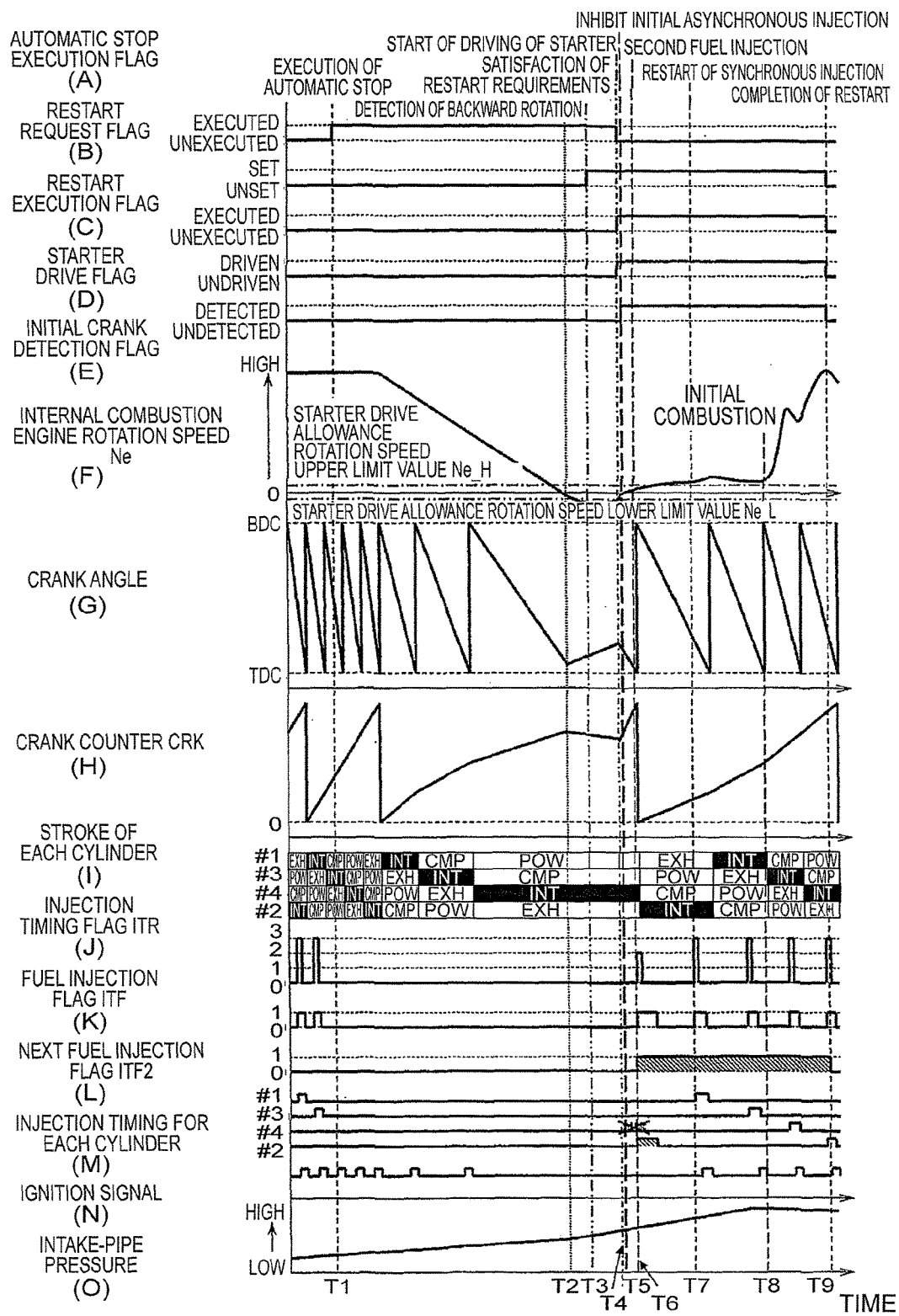
FIG. 13 is a timing chart at the time of restart in a case where restart requirements are satisfied while an engine 1 is in a backward rotation state to inhibit the execution of initial asynchronous injection in the automatic stop/restart device for an internal combustion engine according to the first embodiment of the present invention.

Next, a specific example of the first embodiment of the present invention is described referring to timing charts of FIGS. 12 and 13. FIGS. 12 and 13 are timing charts from the execution of the automatic stop to the completion of the restart by the automatic stop/restart device for an internal combustion engine according to the first embodiment of the present invention.

In FIGS. 12 and 13, parts (A) to (O) represent temporal changes in the following:
(A): automatic stop execution flag;
(B): restart request flag;
(C): restart execution flag;
(D): starter drive flag;
(E): initial crank detection flag;
(F): rotation speed Ne of the internal combustion engine;
(G): crank angle;
(H): crank counter CRK;
(I): stroke of each of the cylinders;
(J): injection timing flag ITR;
(K): fuel injection flag ITF;
(L): second fuel injection flag ITF2;
(M): injection timing of each of the cylinders;
(N): ignition signal; and
(O): intake-pipe pressure.

FIGS. 12 and 13 are timing charts in the following case. When the automatic stop requirements are satisfied at a time T1, the automatic stop control such as the stop of the fuel supply and the control to set the throttle valve 6 to an automatic stop control opening degree is executed to set the automatic stop execution flag (A) to 1. When the rotation speed Ne (F) drops with elapse of time, the timing at which the restart requirements are satisfied differs.

First, a description is made referring to FIG. 12. FIG. 12 is a timing chart in a case where the initial asynchronous injection is executed after the restart request (at a time T2) in the automatic stop/restart device for an internal combustion engine according to the first embodiment of the present invention. At the time T2, when the driver performs a starting operation such as release of a brake pedal and depression of an accelerator pedal, the restart requirements are satisfied. Therefore, the restart request flag (B) is set to 1.

At the time T2, however, the rotation speed Ne (F) of the engine 1 is higher than the starter drive allowance rotation speed upper limit value Ne_H. Therefore, even when the restart requirements are satisfied, the starter 15 is not allowed to be driven. Therefore, the starter drive flag (D) remains unchanged and the starter 15 waits until the rotation speed Ne (F) of the engine 1 drops.

At a time T3, the rotation speed Ne (F) of the engine 1 becomes lower than the starter drive allowance rotation speed upper limit value Ne_H. As a result, the drive signal is transmitted to the starter 15, and the starter drive flag (D) is set to 1 to start driving the starter 15. Therefore, the cranking of the engine 1 is started. Moreover, as a result of the start of driving of the starter 15, the restart control is also executed. Therefore, the restart execution flag (C) is set to 1, whereas the automatic stop execution flag (A) is set to zero.

When the restart control is executed at the time T3, the restart fuel processing (see FIG. 5) starts. Thus, the basic supply fuel amount is computed based on the cooling water temperature for the engine 1. The basic supply fuel amount is corrected based on the intake-pipe pressure at the time to set the final injection fuel amount. Moreover, the restart crank signal processing (see FIG. 8) is executed.

When the initial crank signal after the restart is detected at a time T4, the initial crank detection flag (E) is set to 1. At the same time, because the stroke (I) of each of the cylinders of the engine 1 at the time shows that there exists a cylinder (second cylinder in FIG. 12) into which the fuel can be supplied, the injection timing flag ITR (J) is set to 1, and the fuel injection into the second cylinder is started with the asynchronous injection (part (M) of FIG. 12). Then, the fuel injection flag ITF (K) is set to 1.

When the initial asynchronous injection is terminated, the fuel injection flag ITF (K) is set to zero. Moreover, at the time T4, the cylinder crk_2c into which the next fuel injection is performed and the injection timing crk_2t thereof (the start of the intake stroke of the first cylinder in FIG. 12, that is, crk_2c=1 and crk_2t=0) are determined.

The cranking of the engine 1 starts, and the crank counter CRK (H) is updated. Then, the current time coincides with a time T5 corresponding to the next injection timing (specifically, the crank counter crk_2t becomes 0 corresponding to the start of the intake stroke). At this next injection timing, the injection timing flag ITR (J) is set to 2 to start the fuel injection. As a result, the fuel injection flag ITF (K) is set to 1, and the next fuel injection flag ITF2 (L) is set to 1. Next, the next fuel injection flag ITF2 (L) is not set to zero until the completion of the restart (at a time T8).

At a time T6, both the initial asynchronous injection and the next fuel injection are already executed. Therefore, when the predetermined crank angle (for example, 70 degrees before TDC) is detected, the synchronous injection for injecting the fuel is started. As the processing, after the injection timing flag ITR (J) is set to 3, the fuel injection into the third cylinder in the case of FIG. 12 is executed and the fuel injection flag ITF is set to 1 (parts (K) and (M) of FIG. 12).

Then, at the time T7, the fuel supplied by the initial asynchronous injection is combusted, and hence the rotation speed Ne (F) of the engine 1 starts increasing. Thereafter, the supplied fuel is sequentially combusted to increase the rotation speed Ne (F) of the engine 1. At a time T8, the restart completion is determined. As a result, the restart request flag (B), the restart execution flag (C), the starter drive flag (D), the initial crank detection flag (E), and the next fuel injection flag ITF2 (L) are set to zero, and various types of control such as a transition to normal control for the throttle valve 6 are executed. Then, the restart is completed.

Next, a description is given referring to FIG. 13. FIG. 13 is a timing chart at the time of restart in a case where the restart requirements are satisfied while the engine 1 is in the backward rotation state to inhibit the execution of the initial asynchronous injection in the automatic stop/restart device for an internal combustion engine according to the first embodiment of the present invention. In FIG. 13, at a time T1, the automatic stop requirements are satisfied. Then, with elapse of time, the rotation speed Ne (F) of the engine 1 drops. At a time T2, the backward rotation state is determined. After the determination of the backward rotation state, the crank angle (G) increases, whereas the crank counter CRK (H) decreases (from the time T2 to a time T4).

Then, at a time T3, the restart requirements are satisfied, and hence the restart request flag (B) is set to 1. However, the rotation speed Ne (F) of the engine 1 becomes higher than the starter drive allowance rotation speed lower limit value Ne_L. Therefore, the starter 15 is not allowed to be driven, and hence the drive signal is not output.

After the time T3, the rotation speed Ne (F) of the engine 1 drops. When the rotation speed Ne of the engine 1 becomes equal to or lower than the starter drive allowance rotation speed lower limit value Ne_L at the time T4, the drive signal is transmitted to the starter 15, and the starter drive flag (D) is set to 1. Further, the restart execution flag (C) is set to 1. As a result, the restart control is started.

After the restart control is executed, the initial crank signal is detected at a time T5. Then, the crank signal within the fuel supply range is determined, and the initial crank detection flag (E) is set to 1. In the case of FIG. 13, when the initial crank detection flag is set to 1, the fourth cylinder is in the intake stroke (part (I) of FIG. 13). However, it is determined that the initial crank counter computation value CRK is not the crank counter value within the fuel supply range. Therefore, the initial asynchronous injection at the time T5 is inhibited (part (M) of FIG. 13). Therefore, the injection timing flag ITR (J) and the fuel injection flag ITF (K) both remain zero.

Moreover, at the time T5, the next injection cylinder is the second cylinder (part (I) of FIG. 13). Therefore, the next injection cylinder crk_2c is set to 2, and the next fuel injection timing crk_2t is set to 54. Then, at a time T6 at which the intake stroke of the second cylinder starts, the injection timing flag ITR (J) is set to 2 to start the fuel injection (part (M) of FIG. 13). At the same time, the fuel injection flag ITF (K) is set to 1, and the next fuel injection flag ITF2 (L) is set to 1. When the fuel injection into the second cylinder is terminated, the fuel injection flag ITF (K) is set to zero.

Then, after the time T6, the next fuel injection is already executed. Therefore, when the predetermined crank angle (for example, 70 degrees before TDC) is detected, the synchronous injection for injecting the fuel is started. At the time T7, the predetermined crank angle is detected. Therefore, the injection timing flag ITR (J) is set to 3 to start the fuel injection into the corresponding cylinder (the first cylinder in the case of FIG. 13). Therefore, the fuel injection flag ITF (K) is set to 1.

Then, at a time T8, the cylinder into which the next fuel injection is executed (the second cylinder in the case of FIG. 13) comes to compression TDC. Therefore, a spark is generated from the spark plug to cause the initial combustion. As a result, the rotation speed Ne (F) of the engine 1 starts increasing. Thereafter, the fuel supplied to each of the cylinders of the engine 1 is combusted in accordance with the ignition signal. As a result, the rotation speed Ne (F) of the engine 1 increases. At a time T9, the restart is completed.

As described above, according to the first embodiment, the fuel can be injected into a proper one of the cylinders of the engine, regardless of the rotation state of the engine after the automatic stop. Thus, quick restart can be achieved. Further, because the fuel can be injected into the proper cylinder, the fuel is prevented from being wastefully injected.

Although the internal combustion engine having the four cylinders has been specifically described in the first embodiment, the present invention is not limited thereto. The present invention is also applicable to a multi-cylinder internal combustion engine having six cylinders, three cylinders, or the like. The above-mentioned case can be dealt with by changing the settings in FIGS. 6, 7, 10, and 11. Further, although the starter has been used to describe the starting device, the starting device is not limited thereto. The present invention is also applicable to an internal combustion engine using a motor generator (MG) or the like.

Supplemental Description to Claim 5

In the Description of the Above-Mentioned First Embodiment, the Basic supply fuel amount is determined from the cooling temperature based on the basic supply fuel amount map shown in FIG. 6 and the basic supply fuel amount is corrected in accordance with the intake-pipe pressure at the time of restart of the internal combustion engine based on the correction coefficient map shown in FIG. 7 to determine the final injection fuel amount. However, the method of determining the fuel injection amount during the execution of the restart operation in the present invention is not limited thereto. The fuel injection amount can also be determined in accordance with at least one piece of information including the intake-pipe pressure of the internal combustion engine, the rotation speed, and the cooling water temperature therefor (alternatively, a two-step determination with the basic supply fuel amount and the final injection fuel amount can be made in accordance with the above-mentioned pieces of information).

The invention claimed is:

1. An automatic stop/restart device for an internal combustion engine, for performing an automatic stop operation for the internal combustion engine when a predetermined automatic stop requirement is satisfied during an operation of the internal combustion engine and for performing a restart operation for the internal combustion engine when a predetermined restart requirement is satisfied during an automatic stop time period of the internal combustion engine, the automatic stop/restart device comprising:
- a crank-angle detector, implemented by at least one processor, for changing an output signal thereof in accordance with a forward rotation state and a backward rotation state of the internal combustion engine, and for detecting a crank angle of the internal combustion engine;
- a rotation-speed calculator, implemented by the at least one processor, for determining whether the internal combustion engine is in the forward rotation state or the backward rotation state, and for computing a rotation speed of the internal combustion engine in the forward rotation state or the backward rotation state in accordance with the crank-angle detector;
- a synchronous fuel injector for injecting a fuel in synchronization with a predetermined crank angle during the operation of the internal combustion engine;
- a starting device for cranking the internal combustion engine at time of start and restart of the internal combustion engine; and
- a restart controller, implemented by the at least one processor, for performing a restart operation for the internal combustion engine by controlling the starting device while the rotation speed during the automatic stop time period of the internal combustion engine is decreasing by inertia or after stop,
- wherein the restart controller starts the restart operation by driving the starting device when the predetermined restart requirement is satisfied and when the rotation speed of the internal combustion engine computed by the rotation-speed calculator falls within a range between a drive allowance upper limit rotation speed defined in a forward rotation range and a drive allowance lower limit rotation speed defined in a backward rotation range, and
- wherein the restart controller comprises:
    - an initial asynchronous injection processing section for determining whether or not initial asynchronous injection of the fuel into a cylinder that is in an intake stroke is executable in accordance with an initially detected crank angle after start of the restart operation; and
    - a next injection determination processing section for determining a cylinder that will be the next cylinder to transition from an exhaust stroke to the intake stroke after the initially detected crank angle as a next injection cylinder and determining an injection timing for the next injection cylinder,
- wherein the restart controller executes fuel injection control at the time of start of the restart operation in accordance with a result of determination by the initial asynchronous injection processing section and a result of determination by the next injection determination processing section, and
- wherein the initial asynchronous injection processing section inhibits execution of the initial asynchronous injection when the internal combustion engine is in the backward rotation state.

2. The automatic stop/restart device for the internal combustion engine according to claim 1, wherein the initial asynchronous injection processing section inhibits execution of the initial asynchronous injection when the initially detected crank angle falls outside a preset range in which the fuel is suppliable.

3. The automatic stop/restart device for the internal combustion engine according to claim 2, wherein the next injection determination processing section executes the fuel injection at a crank angle at which the intake stroke of the cylinder that will be the next cylinder to transition from the exhaust stroke to the intake stroke after the initially detected crank angle after the start of the restart operation starts.

4. The automatic stop/restart device for the internal combustion engine according to claim 2, wherein an injection amount of the fuel is determined in accordance with at least one of: an intake-pipe pressure of the internal combustion engine, the rotation speed, and a cooling water temperature therefor during execution of the restart operation.

5. The automatic stop/restart device for the internal combustion engine according to claim 1, wherein the next injection determination processing section executes the fuel injection at a crank angle at which the intake stroke of the cylinder that will be the next cylinder to transition from the exhaust stroke to the intake stroke after the initially detected crank angle after the start of the restart operation starts.

6. The automatic stop/restart device for the internal combustion engine according to claim 1, wherein an injection amount of the fuel is determined in accordance with at least one of: an intake-pipe pressure of the internal combustion engine, the rotation speed, and a cooling water temperature therefor during execution of the restart operation.

7. An automatic stop/restart method for an internal combustion engine, for performing an automatic stop operation for the internal combustion engine when a predetermined automatic stop requirement is satisfied during an operation of the internal combustion engine and for performing a restart operation for the internal combustion engine when a predetermined restart requirement is satisfied during an automatic stop time period of the internal combustion engine, the automatic stop/restart method comprising:
- a crank-angle detection step of changing an output signal thereof in accordance with a forward rotation state and a backward rotation state of the internal combustion engine, and reading the output signal output from a crank-angle detector which detects a crank angle of the internal combustion engine;
- a rotation-speed computation step of determining whether the internal combustion engine is in the forward rotation state or the backward rotation state, and computing a rotation speed of the internal combustion engine in the forward rotation state or the backward rotation state in accordance with the crank-angle detection step;
- a synchronous fuel injection step of injecting a fuel in synchronization with a predetermined crank angle during the operation of the internal combustion engine;
- a starting step of cranking the internal combustion engine by driving a starting device at time of start and restart of the internal combustion engine; and
- a restart control step of performing a restart operation for the internal combustion engine by controlling the starting step while the rotation speed during the automatic stop time period of the internal combustion engine is decreasing by inertia or after stop,
- wherein the restart control step starts the restart operation by driving the starting device, when the predetermined restart requirement is satisfied and when the rotation speed of the internal combustion engine computed by the rotation-speed computation step falls within a range between a drive allowance upper limit rotation speed defined in a forward rotation range and a drive allowance lower limit rotation speed defined in a backward rotation range, and wherein the restart control step comprises:
an initial asynchronous injection processing step of determining whether or not initial asynchronous injection of the fuel into a cylinder that is in an intake stroke is executable in accordance with an initially detected crank angle after start of the restart operation; and
a next injection determination processing step of determining a cylinder that will be the next cylinder to transition from an exhaust stroke to the intake stroke after the initially detected crank angle as a next injection cylinder and determining an injection timing for the next injection cylinder,
wherein the restart control step comprises executing fuel injection control at the time of start of the restart operation in accordance with a result of determination in the initial asynchronous injection processing step and a result of determination in the next injection determination processing step, and
wherein the initial asynchronous injection processing step comprises inhibiting execution of the initial asynchronous injection when the internal combustion engine is in the backward rotation state.

* * * * *